United States Patent
Nakanishi

(10) Patent No.: US 10,306,173 B2
(45) Date of Patent: May 28, 2019

(54) IMAGING APPARATUS, IMAGING METHOD, AND PROGRAM

(71) Applicant: CANON KABUSHIKI KAISHA, Tokyo (JP)

(72) Inventor: Toru Nakanishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/971,326

(22) Filed: May 4, 2018

(65) Prior Publication Data

US 2018/0255262 A1   Sep. 6, 2018

Related U.S. Application Data

(63) Continuation of application No. 15/128,892, filed as application No. PCT/JP2015/001487 on Mar. 17, 2015, now Pat. No. 9,992,438.

(30) Foreign Application Priority Data

Mar. 28, 2014 (JP) ................................. 2014-069412

(51) Int. Cl.
*H04N 5/44* (2011.01)
*H04N 7/18* (2006.01)
*H04N 5/232* (2006.01)
*H04N 7/01* (2006.01)

(52) U.S. Cl.
CPC .......... *H04N 5/44* (2013.01); *H04N 5/23206* (2013.01); *H04N 7/01* (2013.01); *H04N 7/183* (2013.01)

(58) Field of Classification Search
CPC ......... H04N 5/44; H04N 5/23206; H04N 7/01
See application file for complete search history.

(56) References Cited

U.S. PATENT DOCUMENTS

2006/0253552 A1* 11/2006 Ohi .................... H04N 5/23206
                                                                709/219
2011/0164679 A1*  7/2011 Satou .................. H04N 19/172
                                                                375/240.03
2015/0296119 A1* 10/2015 Iwasaki .............. H04N 5/23206
                                                                348/211.3

* cited by examiner

*Primary Examiner* — Padma Haliyur
(74) *Attorney, Agent, or Firm* — Canon U.S.A., Inc. I.P. Division

(57) ABSTRACT

An imaging apparatus can communicate with an external apparatus via a network. The imaging apparatus includes an imaging unit configured to capture an image of a target object, a coding unit configured to compress a video captured by the imaging unit, and a reception unit configured to receive at least two types of coding method setting commands, which can be used to set a coding method to be used by the coding unit, via the network. The imaging apparatus further includes a conversion unit configured to automatically convert coding method information to be set by coding setting command into at least one type of different coding method information, and a storage unit configured to store coding method information to be set by the coding setting command and the coding method information converted by the conversion unit.

14 Claims, 18 Drawing Sheets

FIG.16

```
<s:Envelope
        xmlns:a="http://www.w3.org/2005/08/addressing"
        xmlns:s="http://www.w3.org/2003/05/soap-envelope">
 <s:Header>
  ...
 </s:Header>
 <s:Body
        xmlns:xsi="http://www.w3.org/2001/XMLSchema-instance"
        xmlns:xsd="http://www.w3.org/2001/XMLSchema">
  <GetProfile
        xmlns="http://www.onvif.org/ver10/media/wsdl">
   <ProfileToken>profile0</ProfileToken>
  </GetProfile>
 </s:Body>
</s:Envelope>
```

FIG. 17

```xml
<xs:complexType name="Profile">
  <xs:sequence>
    <xs:element name="Name" type="tt:Name" />
    <xs:element name="VideoSourceConfiguration" type="tt:VideoSourceConfiguration" minOccurs="0" />
    <xs:element name="AudioSourceConfiguration" type="tt:AudioSourceConfiguration" minOccurs="0" />
    <xs:element name="VideoEncoderConfiguration" type="tt:VideoEncoderConfiguration" minOccurs="0" />
    <xs:element name="AudioEncoderConfiguration" type="tt:AudioEncoderConfiguration" minOccurs="0" />
    <xs:element name="VideoAnalyticsConfiguration" type="tt:VideoAnalyticsConfiguration" minOccurs="0" />
    <xs:element name="PTZConfiguration" type="tt:PTZConfiguration" minOccurs="0" />
    <xs:element name="MetadataConfiguration" type="tt:MetadataConfiguration" minOccurs="0" />
    <xs:element name="Extension" type="tt:ProfileExtension" minOccurs="0" />
    <xs:attribute name="token" type="tt:ReferenceToken" use="required" />
    <xs:attribute name="fixed" type="xs:boolean" />
  </xs:sequence>
</xs:complexType>

<xs:complexType name="ProfileExtension">
  <xs:sequence>
    <xs:element name="AudioOutputConfiguration" type="tt:AudioOutputConfiguration" minOccurs="0" />
    <xs:element name="AudioDecoderConfiguration" type="tt:AudioDecoderConfiguration" minOccurs="0" />
    <xs:element name="Extension" type="tt:ProfileExtension2" minOccurs="0" />
  </xs:sequence>
</xs:complexType>

<xs:complexType name="ProfileExtension2">
  <xs:sequence>
    <xs:element name="VideoEncoderConfiguration2" minOccurs="0" />
  </xs:sequence>
</xs:complexType>
```

FIG.18

```
<xs:complexType name="VideoEncoderConfiguration2">
  <xs:sequence>
    <xs:element type name="Encoding" type="xs:string"/>
    <xs:element type name="Resolution" type="tt:VideoResultion2"/>
    <xs:element type name="Quality" type="xs:float"/>
    <xs:element type name="RateControl" type="tt:VideoRateControl2"/>
    <xs:element type name="Multicast" type="tt:MulticastConfiguration"/>
    <xs:element type name="SessionTimeout" type="xs:duration"/>
  </xs:sequence>
  <xs:attribute name="GovLength" type="xs:int" >
  <xs:attribute name="EncodingProfile" type="xs:string" >
</xs:complexType>

<xs:complexType name="VideoResolution2">
      <xs:sequence>
            <xs:element name="Width" type="xs:int" />
            <xs:element name="Height" type="xs:int" />
      </xs:sequence>
</xs:complexType>

<xs:complexType name="VideoRateControl2">
      <xs:sequence>
            <xs:element name="FrameRateLimit" type="xs:int" />
            <xs:element name="EncodingInterval" type="xs:int" />
            <xs:element name="BitrateLimit" type="xs:int" />
      </xs:sequence>
</xs:complexType>
```

IMAGING APPARATUS, IMAGING METHOD, AND PROGRAM

CROSS-REFERENCE TO RELATED APPLICATIONS

This application is a continuation of U.S. patent application Ser. No. 15/128,892, filed on Sep. 23, 2016, that is a national phase application of international patent application PCT/JP2015/001487 filed on Mar. 17, 2015, and claims the benefit of, and priority to, Japanese Patent Application No. 2014-069412 filed Mar. 28, 2014, which applications are hereby incorporated by reference herein in their entireties.

TECHNICAL FIELD

The present invention relates to an imaging apparatus. More specifically, the present invention relates to a technique of setting a method for coding image data output from an imaging apparatus.

BACKGROUND ART

As discussed in Japanese Patent Application Laid-Open No. 2012-227602, there is a conventional imaging apparatus that is capable of coding captured image data and outputting the coded image data to an external device via a network. Among various types of image data coding methods, JPEG and MPEG4 are representative coding methods applicable to still images and H.264 is a representative coding method applicable to moving images.

For example, the JPEG and H.264 coding methods can be implemented by a network camera apparatus that encodes image data according to a coding method designated by a client apparatus and performs streaming processing for distributing the coded image data to the client apparatus via a network.

Further, standard protocols are conventionally used to establish common communication interfaces when a network camera apparatus communicates with a client apparatus via a network. An example of the conventionally known standard protocols is common standards formulated by Open Network Video Interface Forum (ONVIF).

The coding methods presently defined according to the ONVIF are JPEG applicable to still images and MPEG4 or H.264 applicable to moving images.

New versions of the network camera apparatus and the client apparatus, in which setting commands conforming to a new coding method (e.g., JPEG2000 or H.265) can be implemented, will be possibly introduced in the future to satisfy the needs for enhanced image quality and higher compression.

Therefore, installation of a new network camera apparatus brings a complicated situation in a network system, in which new and old network camera apparatuses are mixed with new and old client apparatuses. Therefore, a new network camera apparatus is required to maintain sufficient consistency in system implementation to provide an interface capable of maintaining adequate backward compatibility. In addition, subsidiary usage of existing commands may be recommended to reduce the number of newly added commands.

CITATION LIST

Patent Literature

[PTL 1]
Japanese Patent Application Laid-Open No. 2012-227602

SUMMARY OF INVENTION

In consideration of the above-mentioned problems, the objective of the present invention is to provide an imaging apparatus that can reduce inconsistency in system implementation and is excellent in user friendliness, even when the existing commands are subsidiarily used in such a way as to conform to a new coding method.

In order to achieve the above objective, according to an aspect of the present invention, an imaging apparatus can communicate with an external apparatus via network. The imaging apparatus includes an imaging unit configured to capture an image of a target object, a coding unit configured to encode a video captured by the imaging unit, and a reception unit configured to receive at least two types of coding method setting commands, which can be used to set coding method information including a coding method to be used by the coding unit, via the network. The imaging apparatus further includes a conversion unit configured to automatically convert coding method information to be set by coding setting command into at least one type of different coding method information, and a storage unit configured to store coding method information to be set by the coding setting command and the coding method information converted by the conversion unit.

Further features of the present invention will become apparent from the following description of exemplary embodiments with reference to the attached drawings.

BRIEF DESCRIPTION OF DRAWINGS

FIG. 1 is a system configuration diagram illustrating a configuration of an imaging system according to a first exemplary embodiment of the present invention.

FIG. 2 is a block diagram illustrating an internal configuration of a monitoring camera that constitutes the imaging system according to the first exemplary embodiment.

FIG. 3 is a block diagram illustrating an internal configuration of a client apparatus 2000 that constitutes a part of the imaging system according to the first exemplary embodiment.

FIG. 4 is a block diagram illustrating an internal configuration of a client apparatus 2010 that constitutes a part of the imaging system according to the first exemplary embodiment.

FIG. 5 is a configuration diagram of parameters that can be held by the monitoring camera according to the first exemplary embodiment of the present invention.

FIG. 6 is a command sequence diagram illustrating processing that can be performed between the monitoring camera and the client apparatus 2000 according to the first exemplary embodiment.

FIG. 7 is a command sequence diagram illustrating processing that can be performed between the monitoring camera and the client apparatus 2010 according to the first exemplary embodiment.

FIG. 8 is a flowchart illustrating SetVEC reception processing that can be performed by the monitoring camera according to the first exemplary embodiment.

FIG. 9 is a flowchart illustrating SetVEC reception processing that can be performed by the monitoring camera according to the first exemplary embodiment.

FIG. 10 is a flowchart illustrating SetVEC2 reception processing that can be performed by the monitoring camera according to the first exemplary embodiment.

FIG. 11 is a flowchart illustrating SetVEC2 reception processing that can be performed by the monitoring camera according to a second exemplary embodiment of the present invention.

FIG. 12 is a flowchart illustrating AddVEC reception processing that can be performed by the monitoring camera according to a third exemplary embodiment.

FIG. 13 is a configuration diagram of parameters that can be held by the monitoring camera according to the first and third exemplary embodiments.

FIG. 14 is a diagram illustrating a graphical user interface (GUI) of the client apparatus 2010 according to the third exemplary embodiment.

FIG. 15 is a diagram illustrating another state of the GUI of the client apparatus 2010 according to the third exemplary embodiment.

FIG. 16

FIG. 16 is a diagram illustrating an XML example according to the first exemplary embodiment.

FIG. 17

FIG. 17 is a diagram illustrating an XML example according to the first exemplary embodiment.

FIG. 18

FIG. 18 is a diagram illustrating an XML example according to the first exemplary embodiment.

DESCRIPTION OF EMBODIMENTS

Exemplary embodiments of the present invention will now be described in detail with reference to the drawings.

Various configurations described in the following exemplary embodiments are mere examples. The present invention is not limited to the illustrated configurations.

Figure 1:
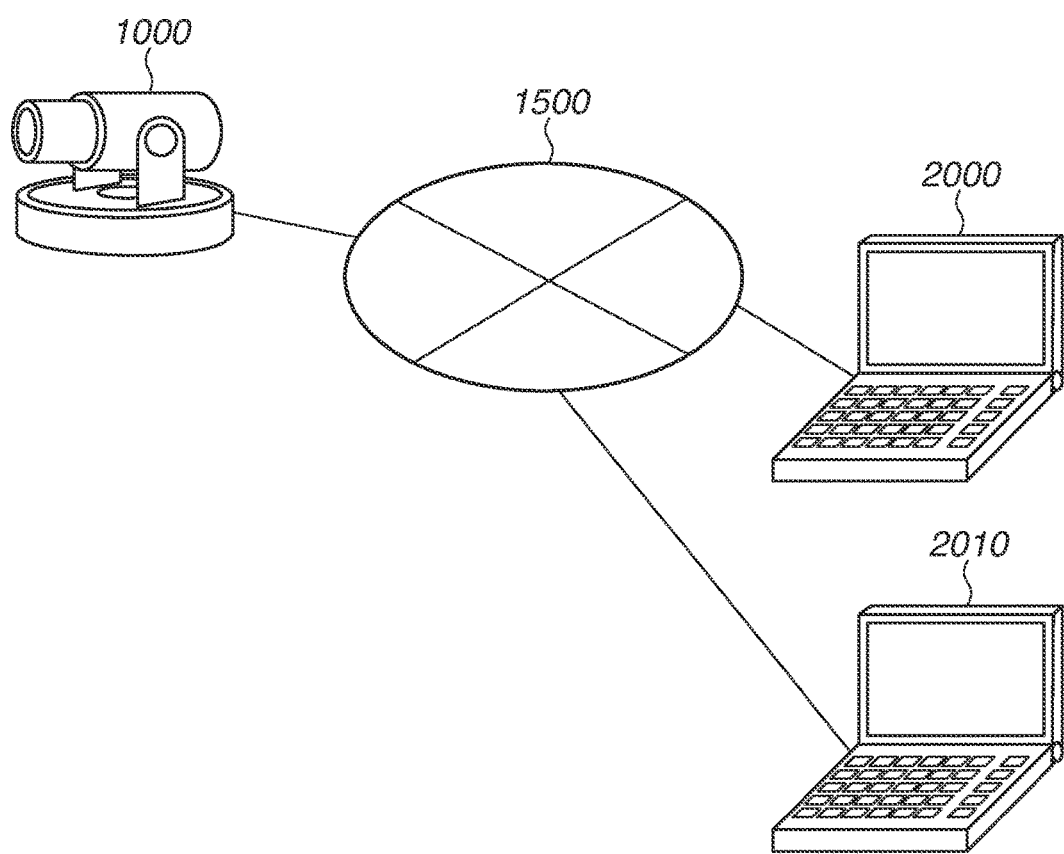
FIG. 1

Hereinafter, a first exemplary embodiment will be described. FIG. 1 is a system configuration diagram illustrating an imaging system that includes a monitoring camera 1000, which corresponds to a transmission apparatus, according to the present exemplary embodiment. Further, the imaging system illustrated in FIG. 1 includes two client apparatuses 2000 and 2010, each of which corresponds to a reception apparatus according to the present exemplary embodiment. The monitoring camera 1000 is connected to each of the client apparatuses 2000 and 2010 via an IP network 1500 (namely, via a network) so that the monitoring camera 1000 can communicate with respective client apparatuses 2000 and 2010.

The imaging system according to the present exemplary embodiment is an example of a transmission and reception system. Further, the monitoring camera 1000 according to the present exemplary embodiment is an imaging apparatus that can capture moving images. More specifically, the monitoring camera 1000 is a network camera that is usable in a monitoring operation.

The IP network 1500 is, for example, constituted by a plurality of routers, switches, and cables, which satisfy communications standards such as Ethernet (registered trademark). However, the network according to the present exemplary embodiment is not limited to the IP network 1500 with respect to communications standards, scale, and configuration. For example, the IP network 1500 can be replaced by any other network via which the monitoring camera 1000 can communicate with respective client apparatuses 2000 and 2010.

For example, the IP network 1500 can be constituted by the internet, a wired local area network (LAN), a wireless LAN, or a wide area network (WAN). The monitoring camera 1000 according to the present exemplary embodiment can be configured to be operable in conformity to, for example, Power Over Ethernet (PoE) (registered trademark) or can be configured to be connected to a LAN cable via which electric power can be supplied. Each of respective client apparatuses 2000 and 2010 can transmit various commands (including an imaging parameter change command, a pan-head driving command, and a video streaming start command) to the monitoring camera 1000. The monitoring camera 1000 can transmit a response replying to each command and video streaming data to the client apparatuses 2000 and 2010.

The system illustrated in FIG. 1 includes only one monitoring camera 1000 and two client apparatuses 2000 and 2010 that are connected to the IP network 1500. However, the system configuration is not limited to the above-mentioned example. For example, the above-mentioned system can include two or more monitoring cameras and three or more client apparatuses.

Figure 2:
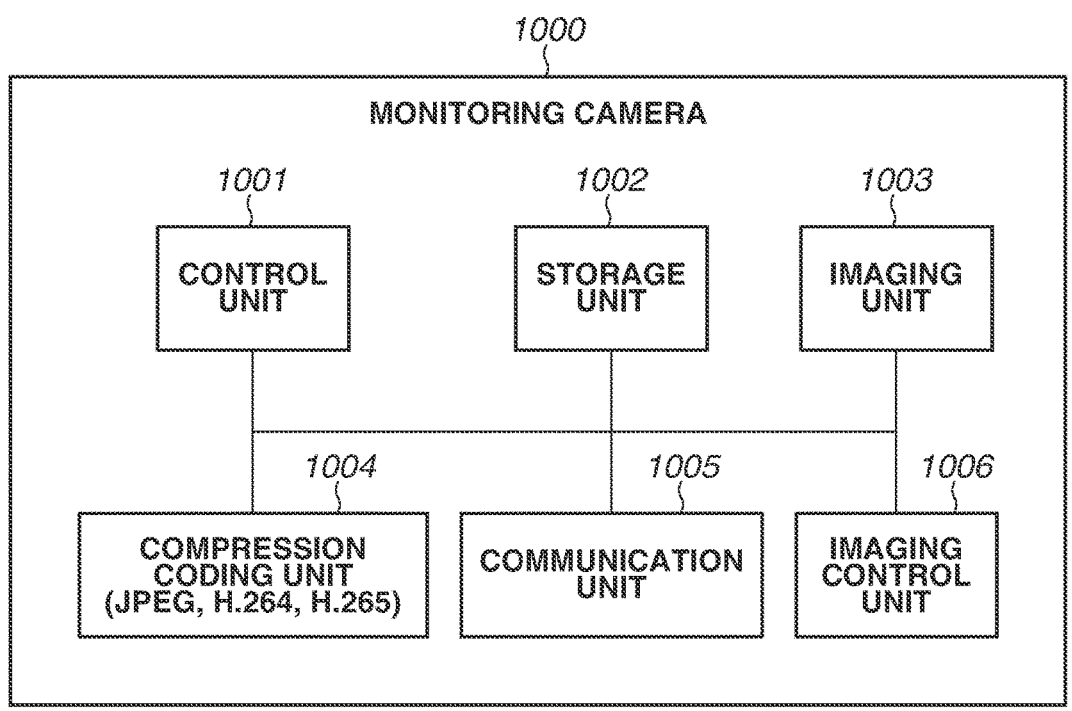
FIG. 2

FIG. 2 is a block diagram illustrating an internal configuration of the monitoring camera 1000 according to the present exemplary embodiment. The monitoring camera 1000 illustrated in FIG. 2 includes a control unit 1001 that can perform various controls to be realized by the monitoring camera 1000. The control unit 1001 can be constituted, for example, by a central processing unit (CPU).

The monitoring camera 1000 further includes a storage unit 1002, which is usable as a program storing area capable of storing programs that can be executed by the control unit 1001, a work area when the control unit 1001 executes each program, a storing area for an image captured by an imaging unit 1003 described below, or any other data storing area.

The monitoring camera 1000 further includes the imaging unit 1003 that can convert an analog signal into digital data. For example, when an image of a target object is captured by an imaging optical system of the monitoring camera 1000, the imaging unit 1003 can output digital data representing the captured image to the storage unit 1002. The monitoring camera 1000 further includes a compression coding unit 1004. The imaging unit 1003 according to the present exemplary embodiment includes an image sensor, such as a charge-coupled device (CCD) or a Complementary Metal Oxide Semiconductor (CMOS).

The compression coding unit 1004 can generate image data by performing compression coding processing on the captured image having been output from the imaging unit 1003 based on a coding method designated by the client apparatus 2000 or 2010. The compression coding unit 1004 can output the generated image data to the storage unit 1002. In this case, the compression coding unit 1004 causes the control unit 1001 to generate a VIDEO transmission trigger to notify a processing result indicating that distributable image data has been output to the storage unit 1002.

In the present exemplary embodiment, the compression coding unit 1004 of the monitoring camera 1000 is operable according to three types of (e.g., JPEG, H.264, and H.265) coding methods. Therefore, the monitoring camera 1000 according to the present exemplary embodiment is operable in conformity to existing coding method settings, such as JPEG and H.264. In other words, the monitoring camera 1000 is operable in conformity to a SetVideoEncoderConfiguration command (which may be simply referred to as "SetVEC command" in the following description). The SetVEC command corresponds to a first coding method setting command.

Further, the monitoring camera 1000 according to the present exemplary embodiment is operable in conformity to H.265 and H.264ProgressiveHighProfile (which may be referred to as "H.264PHP" in the following description) coding methods other than the JPEG, MPEG, and H.264 coding methods. More specifically, the monitoring camera 1000 is operable in conformity to a SetVideoEncoderConfiguration2 command, which may be simply referred to as "SetVEC2 command" in the following description. The SetVEC2 command is in conformity to JPEG, MPEG, and H.264 coding methods. The SetVEC2 command corresponds to a second coding method setting command in the present exemplary embodiment.

Similarly, the monitoring camera 1000 is operable inconformity to a GetVideoEncoderConfiguration (which may be simply referred to as "GetVEC") command. Further, the monitoring camera 1000 is operable in conformity to a GetVideoEncoderConfiguration2 (which may be simply referred to as "GetVEC2") command.

Similarly, the monitoring camera 1000 is operable inconformity to a GetVideoEncoderConfigurations (which may be simply referred to as "GetVECs") command. Further, the monitoring camera 1000 is operable in conformity to a GetVideoEncoderConfigurations2 (which may be simply referred to as "GetVECs2") command.

Similarly, the monitoring camera 1000 is operable inconformity to a GetCompatibleVideoEncoderConfigurations (which may be simply referred to as "GetCVECs") command. Further, the monitoring camera 1000 is operable in conformity to a GetCompatibleVideoEncoderConfigurations2 (which may be simply referred to as "GetCVECs2") command.

Similarly, the monitoring camera 1000 is operable inconformity to a GetVideoEncoderConfigurationOptions (which may be simply referred to as "GetVECOs") command. Further, the monitoring camera 1000 is operable in conformity to a GetVideoEncoderConfigurationOptions2 (which may be simply referred to as "GetVECOs2") command.

In the present exemplary embodiment, setting information VideoEncoderConfiguration including a coding method, such as JPEG, MPEG-4, or H.264 may be conveniently referred to as "VEC1" in the following description. Further, setting information that can include new coding method information (e.g., H.264ProgressiveHighProfile or H.265) other than the existing coding methods may be conveniently referred to as "VEC2" in the following description. The VEC2 can include JPEG, MPEG-4, and H.264 having been set by the SetVEC2 command. In the following description, the VEC1 and the VEC2 are collectively referred to as "VEC."

A communication unit 1005 can receive a control command from an external device and can transmit a stream including a response replying to the received control command and image data to the external device. Each of the client apparatuses 2000 and 2010 according to the present exemplary embodiment is an example of the external device.

An imaging control unit 1006 can be used to control a pan mechanism, a tilt mechanism, and a zoom mechanism according to a pan angle value, a tilt angle value, and a zoom magnification value, respectively, when these values are input from the control unit 1001. Further, the imaging control unit 1006 can periodically provide PTZ Position information to the control unit 1001. The PTZ Position information indicates the present values of the pan angle, the tilt angle, and the zoom magnification. To this end, the imaging control unit 1006 sets a PTZPosition transmission flag.

Further, the imaging control unit 1006 can provide PTZ Status information to the control unit 1001. The PTZ Status information indicates present operating statuses of the pan, tilt, and zoom mechanisms. To this end, the imaging control unit 1006 sets a PTZStatus transmission flag.

Each of the compression coding unit 1004 and the imaging control unit 1006 according to the present exemplary embodiment can be constituted by a sub CPU. Further, each of the pan mechanism, the tilt mechanism, and the zoom mechanism according to the present exemplary embodiment includes a stepping motor and gears. Further, each of the pan mechanism, the tilt mechanism, and the zoom mechanism is an example of a changing unit configured to change the position of the imaging unit 1003.

Figure 3:
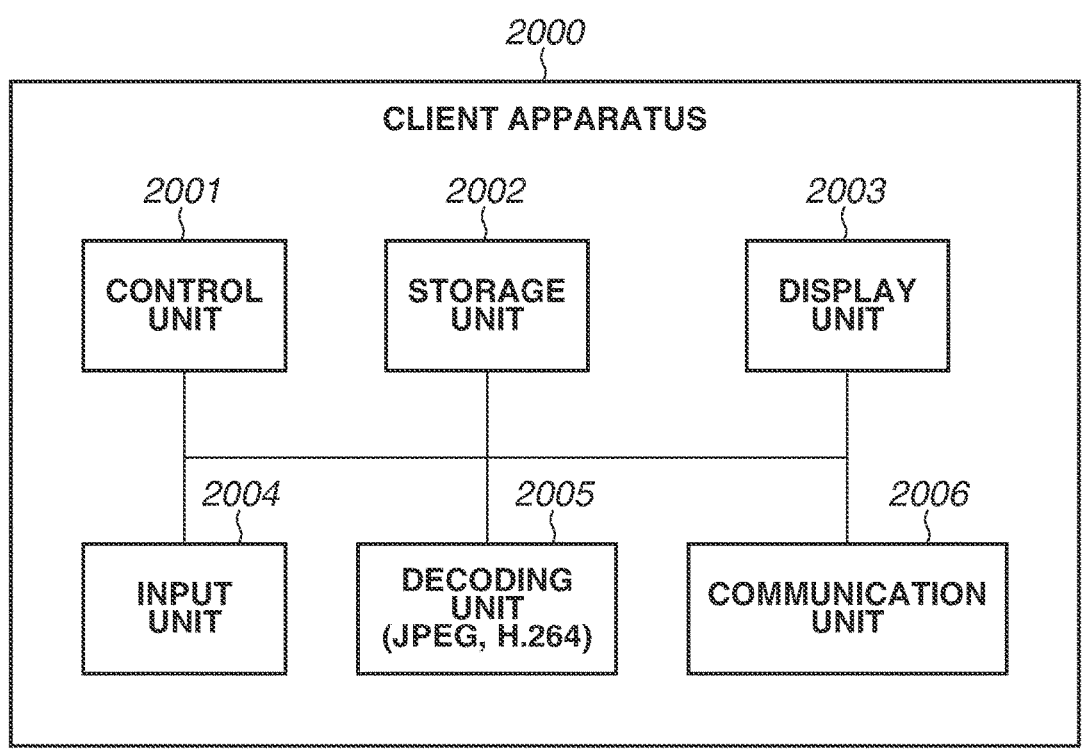
FIG. 3

FIG. 3 is a block diagram illustrating an internal configuration of the client apparatus 2000 according to the present exemplary embodiment. The client apparatus 2000 illustrated in FIG. 3 includes a control unit 2001 (e.g., a CPU) that can perform various controls to be realized by the client apparatus 2000. The client apparatus 2000 further includes a storage unit 2002, which is usable as a program storing area capable of storing programs that can be executed by the control unit 2001, a work area when the control unit 2001 executes each program, or any other data storing area.

The client apparatus 2000 further includes a display unit 2003 that can be constituted, for example, by a liquid crystal display (LCD) device or an organic electroluminescence (EL) display device. The display unit 2003 can display various setting screens, a viewer of video received from the monitoring camera 1000, and various messages, for a user of the client apparatus 2000. The various setting screens include a VideoEncoder setting window described below.

The client apparatus 2000 further includes an input unit 2004, which can be constituted, for example, by various buttons, a cross-key, a touch panel, and a mouse. The input unit 2004 enables a user to perform a screen operation and notifies the control unit 2001 of user operation contents.

The client apparatus 2000 further includes a decoding unit 2005 that can decode compression coded image data received via a communication unit 2006 and develops the decoded image data in the storage unit 2002.

In present exemplary embodiment, the JPEG and H.264 image decoding methods can be implemented by the decoding unit 2005 of the client apparatus 2000. Therefore, the client apparatus 2000 according to the present exemplary embodiment is operable in conformity to only the SetVEC command, which corresponds to the existing (e.g., JPEG and H.264) coding methods, and is not operable in conformity to the SetVEC2 command.

The communication unit 2006 is usable when the client apparatus 2000 transmits each control command to the monitoring camera 1000 and when the client apparatus 2000 receives a response replying to each control command and a stream including image data from the monitoring camera 1000. The decoding unit 2005 according to the present exemplary embodiment is, for example, constituted by a sub CPU.

Figure 4:
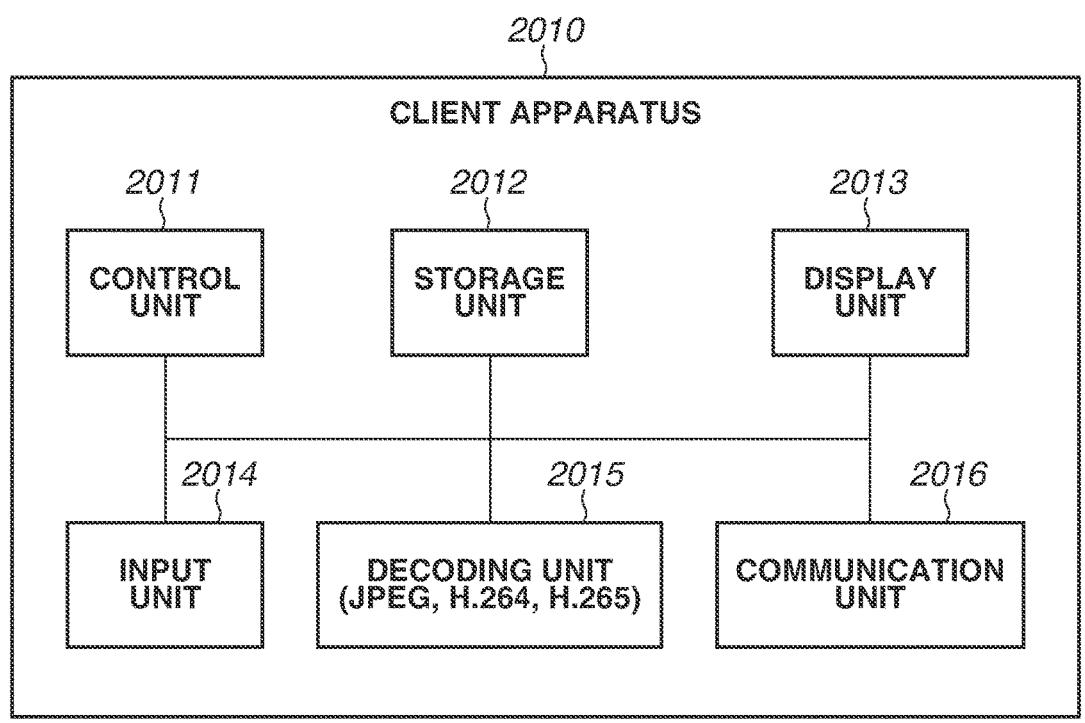
FIG. 4

FIG. 4 is a block diagram illustrating an internal configuration of the client apparatus 2010 according to the present exemplary embodiment. As illustrated in FIG. 4, the client apparatus 2010 according to the present exemplary embodiment includes various processing blocks that are similar to those of the client apparatus 2000 illustrated in FIG. 3, except for a decoding unit 2015.

More specifically, the client apparatus 2010 includes a control unit 2011 that is similar to the control unit 2001. The client apparatus 2010 includes a storage unit 2012 that is similar to the storage unit 2002. Further, the client apparatus 2010 includes a display unit 2013 that is similar to the display unit 2003. The client apparatus 2010 includes an input unit 2014 that is similar to the input unit 2004. The client apparatus 2010 includes a communication unit 2016 that is similar to the communication unit 2006.

The decoding unit 2015 illustrated in FIG. 4 can decode compression coded image data received via the communication unit 2016 and can develop the decoded image data in the storage unit 2012.

The JPEG, H.264, H.264PHP, and H.265 image decoding methods can be implemented by the decoding unit 2015 according to the present exemplary embodiment. Therefore, the client apparatus 2010 according to the present exemplary embodiment is operable in conformity to each of the SetVEC command and the SetVEC2 command. Further, the client apparatus 2010 is operable in conformity to GetVEC, GetVEC2, GetVECs, GetVECs2, GetVECOs, GetVECOs2, GetCVEC, and GetCVEC2 commands.

The internal configurations of the monitoring camera 1000 and respective client apparatuses 2000 and 2010 have been described with reference to FIGS. 1 to 4. The processing blocks illustrated in FIG. 2 are suitable examples and can be modified appropriately in such a way as to constitute the monitoring camera and the client apparatus according to the present invention. For example, the monitoring camera and the client apparatus can be configured to include an audio input unit or an audio output unit, or can be modified and changed in various ways within the scope of the present invention.

Figure 5:
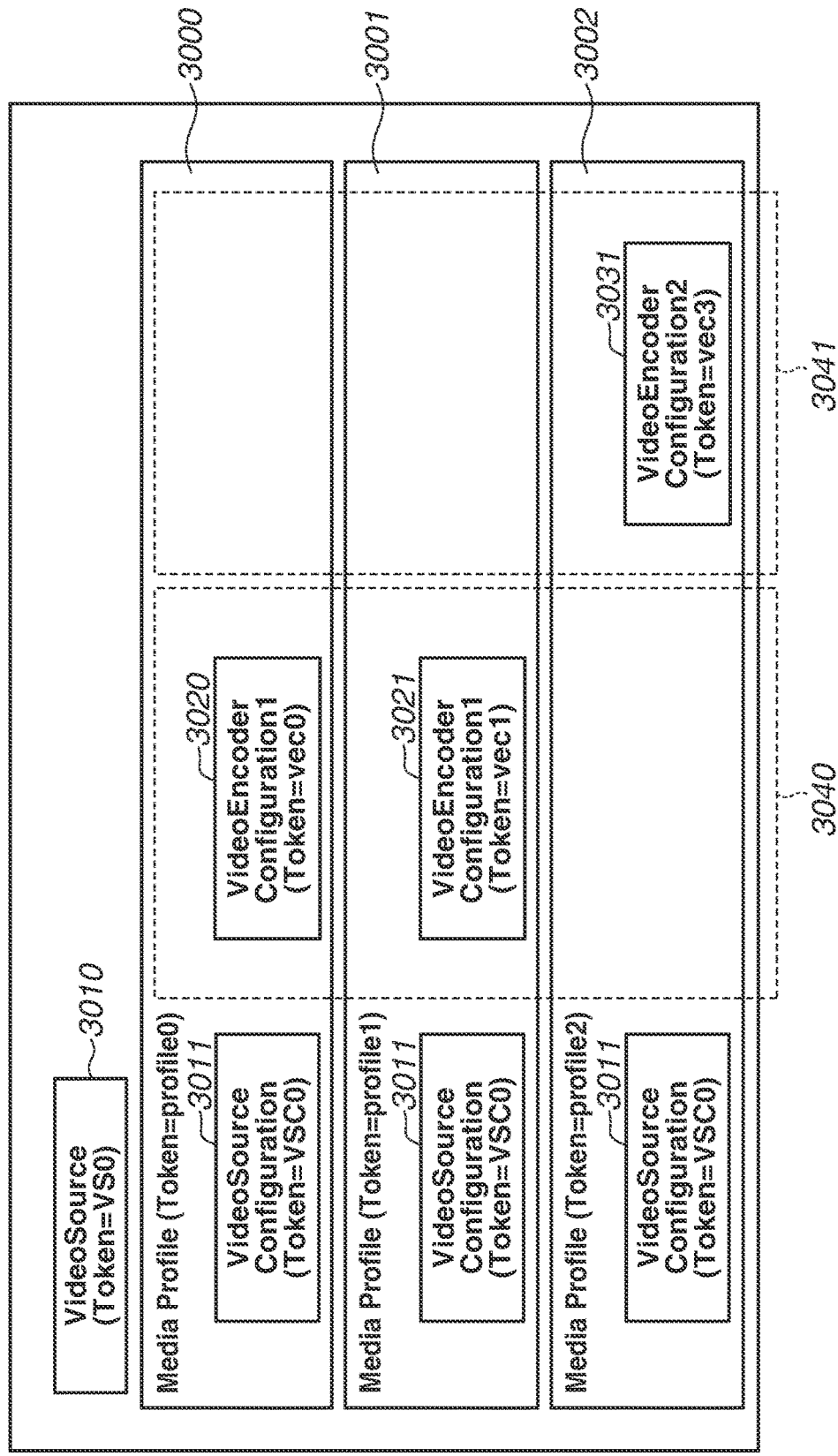
FIG. 5

Subsequently, names and contents of commands and parameters that can be used in the present exemplary embodiment will be described in detail below with reference to FIG. 5. FIG. 5 illustrates a parameter structure that can be held by the storage unit 1002 of the monitoring camera 1000 according to the present exemplary embodiment.

The parameter structure illustrated in FIG. 5 includes three media profiles 3000, 3001, and 3002, each of which is a parameter set that stores various setting items of the monitoring camera 1000 while associating them with each other. In the following description, MP stands for the media profile. Each of respective parameter sets MPs 3000, 3001, and 3002 holds a parameter ProfileToken as ID information about each parameter set MP.

Further, each of the media profiles 3000, 3001, and 3002 holds links to various setting items. The various setting items include VideoSourceConfiguration 3011 and VideoEncoderConfigurations 3020, 3021, and 3031. In the following description, "VSC" stands for the VideoSourceConfiguration. Further, VEC stands for VideoEncoderConfiguration, which is coding method information.

Further, the VideoEncoderConfigurations 3020 and 3021 being set according to the SetVEC command are conveniently referred to as VEC1. On the other hand, the VideoEncoderConfiguration 3031 being set according to the SetVEC2 command is conveniently referred to as VEC2. In the following description, the VEC1 and the VEC2 are collectively referred to as "VEC."

The parameter structure illustrated in FIG. 5 includes a parameter assembly VideoSource 3010 that represents the performance of the imaging unit 1003 provided in the monitoring camera 1000. In the following description, "VS" stands for the parameter assembly VideoSource. In the present exemplary embodiment, the parameter assembly VS 3010 includes a plurality of parameters, such as VideoSourceToken representing ID information about the parameter assembly VS 3010 and Resolution designating a resolution of a captured image that the imaging unit 1003 can output.

The parameter assembly VSC 3011 includes VideoSourceToken of the parameter assembly VS 3010. Thus, the parameter assembly VSC 3011 can associate the parameter assembly VS 3010 provided in the monitoring camera 1000 with respective parameter sets MPs 3000, 3001, and 3002.

In the present exemplary embodiment, the parameter assembly VSC 3011 includes Resolution designating a resolution of a captured image that the imaging unit 1003 can output. Further, the parameter assembly VSC 3011 includes Bounds that designates a portion to be extracted from a captured image output from the imaging unit 1003 and to be distributed to the client apparatus 2000.

The parameter structure illustrated in FIG. 5 includes VEC1 (see 3020 and 3021) and VEC2 (see 3031), each of which is a parameter assembly that associates image data coding related settings with the corresponding parameter set MP.

The monitoring camera 1000 performs compression coding processing on a captured image output from the imaging unit 1003 based on the VEC, with reference to the contents of the parameter assemblies VS and VSC, and distributes the compression coded image data to the client apparatuses 2000 and 2010 via the communication unit 1005.

More specifically, the compression coding unit 1004 generates image data by encoding the captured image according to the parameters (e.g., coding method, frame rate, and resolution) having been set by the VEC.

Further, the VEC1 includes VEC1Token that represents ID information about the VEC1. The VEC2 includes VEC2Token that represents ID information about the VEC2. The VEC further includes Encoding that designates a compression coding method and Resolution that designates a resolution of an output image.

Further, the VEC includes Quality that designates a compression coding quality, FramerateLimit that designates a maximum frame rate of the output image, and BitrateLimit that designates a maximum bit rate.

The parameter structure illustrated in FIG. 5 includes a first storage area 3040 dedicated to the VEC1 and a second storage area 3041 dedicated to the VEC2. The VEC2 can be defined by ProfileExtension2, as illustrated in FIG. 17. Further, the VEC2 is excellent in expandability because a parameter EncodingProfile included in the VEC2 can by designated using a string format as described in detail below with reference to FIG. 18.

Figure 6:
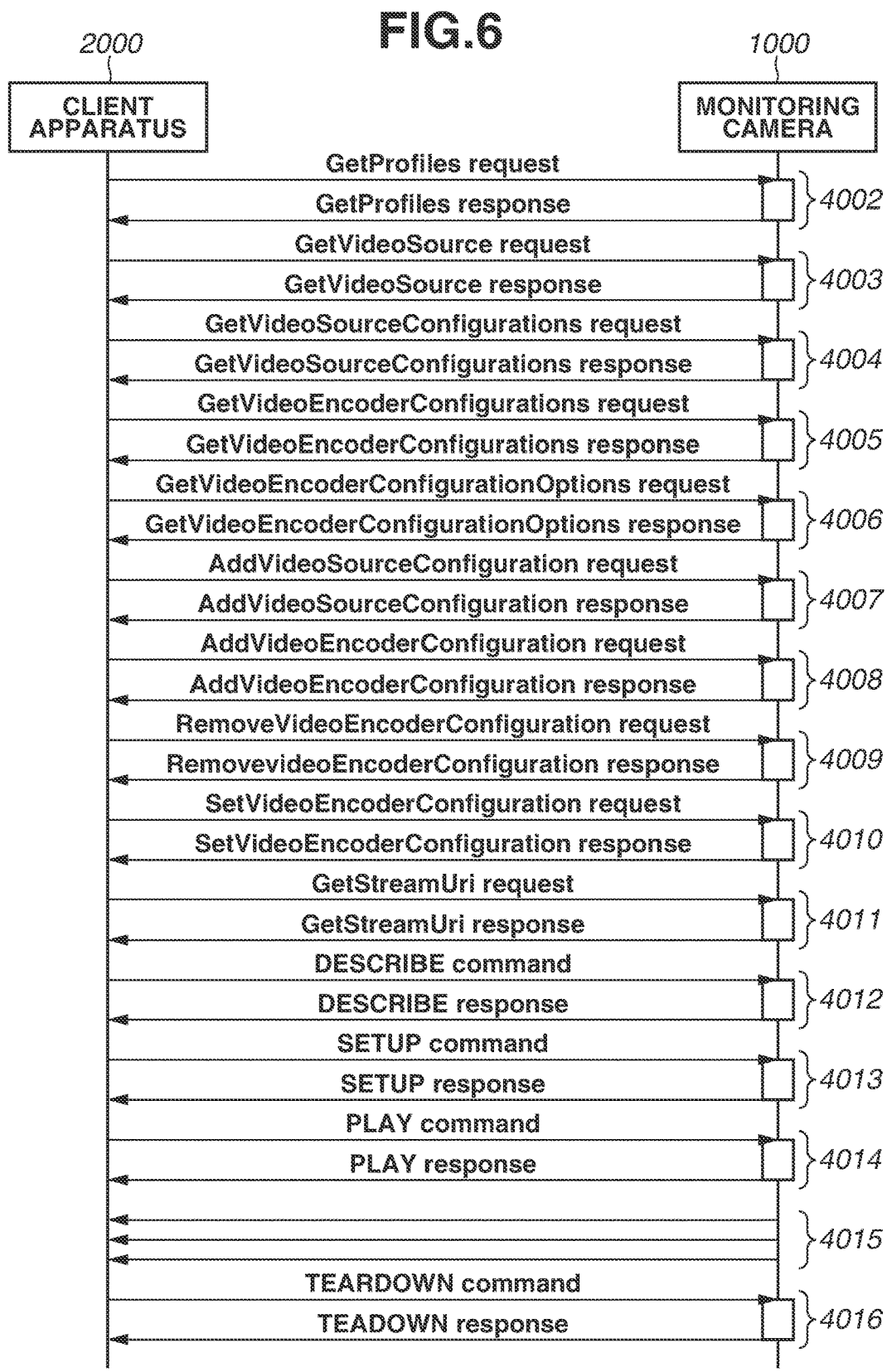
FIG. 6

FIG. 6 is a command sequence diagram illustrating typical processing, which can be performed between the monitoring camera 1000 and the client apparatus 2000, to set a MediaProfile required to distribute a video. In the present exemplary embodiment, each transaction is constituted by a pair of a request (or a command) and a response replying to the request (or the command). For example, the client apparatus 2000 transmits a request (or a command) to the monitoring camera 1000. When the monitoring camera 1000 receives the request (or the command), the monitoring camera 1000 transmits a response replying to the request (or the command) to the client apparatus 2000.

A transaction 4002 is a transaction relating to a GetProfiles command, through which the client apparatus 2000 can acquire a MediaProfile that corresponds to a distribution profile. In the present exemplary embodiment, the MediaProfile is a parameter set that stores various setting items of the monitoring camera 1000 while associating them with each other.

The various setting items include ProfileToken (i.e., ID information about the MediaProfile), parameter assembly VSC, VEC1 and VEC2, and audio encoder. Further, the MediaProfile holds links to respective setting items.

More specifically, the client apparatus 2000 transmits a GetProfiles request to the monitoring camera 1000. If the monitoring camera 1000 receives the GetProfiles request, the monitoring camera 1000 transmits a GetProfiles response including a MediaProfile list to the client apparatus 2000. The MediaProfile list corresponds to the parameter sets MPs 3000, 3001, and 3002 illustrated in FIG. 5.

Through the above-mentioned transaction, the client apparatus 2000 acquires the MediaProfile list that the monitoring camera 1000 can presently use in addition to the parameter ProfileToken corresponding to distribution profile ID usable to identify the MediaProfile. The client apparatus 2000 can identify the MediaProfile (i.e., distribution profile settings that are distributable and are presently held in the monitoring camera 1000) with reference to the distribution profile ID.

A transaction 4003 is a transaction relating to a GetVideoSources command, through which the client apparatus 2000 can acquire a VideoSource list that is held in the monitoring camera 1000 based on the GetVideoSources command.

In the present exemplary embodiment, the parameter assembly VideoSource represents the performance of the imaging unit 1003 provided in the monitoring camera 1000. Further, the parameter assembly VideoSource includes VideoSourceToken representing ID information about VideoSource and Resolution indicating a resolution of a captured image that can be output from the imaging unit 1003.

The client apparatus 2000 transmits a GetVideoSources request to the monitoring camera 1000. If the monitoring camera 1000 receives the GetVideoSources request, the monitoring camera 1000 transmits a GetVideoSources response replying to the received request to the client apparatus 2000.

A transaction 4004 is a transaction relating to a GetVideoSourceConfigurations command, through which the client apparatus 2000 can acquire a VideoSourceConfiguration list that is held in the monitoring camera 1000.

More specifically, the client apparatus 2000 transmits a GetVideoSourceConfigurations request to the monitoring camera 1000. If the monitoring camera 1000 receives the GetVideoSourceConfigurations request, the monitoring camera 1000 transmits a GetVideoSourceConfigurations response replying to the received request to the client apparatus 2000. More specifically, the GetVideoSourceConfigurations response includes a list that stores ID information about the parameter assembly VSC held by the monitoring camera 1000.

A transaction 4005 is a transaction relating to the GetVideoEncoderConfigurations command, through which the client apparatus 2000 can acquire all lists relating to VideoEncoderConfiguration being presently set in the monitoring camera 1000.

The VideoEncoderConfiguration lists acquired by the client apparatus 2000 (i.e., the response acquired in the transaction 4005) includes the VEC1 (see 3020 and 3021) illustrated in FIG. 5. For example, the coding method included in the VEC1 3020 is H.264. The coding method included in the VEC1 3021 is JPEG.

Although described below, when the VEC2 includes JPEG, MPEG4, and H.264 coding methods that are settable by the SetVEC command, it is also feasible to convert the description format in conformity to the VEC1 and transmit a response including the converted description format added to the list. Alternatively, it is also feasible to set the VEC1 through a conversion of the description format when the SetVEC2 command is received.

A transaction 4006 is a transaction relating to the GetVideoEncoderConfigurationOptions command, through which the client apparatus 2000 can acquire choices and setting value ranges of respective parameters that can be received by the monitoring camera 1000, with respect to the VEC designated by the ID information.

A transaction 4007 is a transaction relating to an AddVideoSourceConfiguration command, through which the client apparatus 2000 can request an addition of parameter assembly VSC. More specifically, the client apparatus 2000 transmits an AddVideoSourceConfiguration request to the monitoring camera 1000. If the monitoring camera 1000 receives the AddVideoSourceConfiguration request, the monitoring camera 1000 transmits an AddVideoSourceConfiguration response replying to the received request to the client apparatus 2000. In the above-mentioned transaction, the client apparatus 2000 designates the distribution profile ID acquired in the transaction 4002 and the ID information about the parameter assembly VSC acquired in the transaction 4004. Thus, the client apparatus 2000 can associate a desired parameter assembly VSC corresponding to the designated VSC identification information with the MediaProfile corresponding to the designated distribution profile ID.

A transaction 4008 is a transaction relating to an AddVideoEncoderConfiguration (which may be simply referred to as "AddVEC" in the following description) command, through which the client apparatus 2000 can request an addition of coding information VEC. More specifically, the client apparatus 2000 transmits an AddVEC request to the monitoring camera 1000. If the monitoring camera 1000 receives the AddVEC request, the monitoring camera 1000 transmits an AddVEC response replying to the received request to the client apparatus 2000.

In the above-mentioned transaction, the client apparatus 2000 designates the distribution profile ID acquired in the transaction 400 and the ID information about the VEC acquired in the transaction 4005. Thus, the client apparatus 2000 can associate a VEC setting corresponding to the designated VEC identification information with the MediaProfile corresponding to the designated distribution profile ID.

On the other hand, the monitoring camera 1000 stores the MediaProfile that corresponds to the distribution profile ID designated by the client apparatus 2000 and the VEC setting that corresponds to the ID information about the VEC designated by the client apparatus 2000 while associating them with each other.

Further, although described in detail below, if addition of a specific coding method included in the VEC is requested by the AddVEC command, it is feasible to convert the specific coding method in conformity to the description formats of both the VEC1 and the VEC2 and cause both the first storage unit and the second storage unit to store the converted specific coding method. Practical examples of the specific coding method are JPEG, MPEG4, and H.264, which are the coding methods conforming to both of the SetVEC and SetVEC2 commands.

A transaction 4009 is a transaction relating to a RemoveVideoEncoderConfiguration command. Hereinafter, RemoveVideoEncoderConfiguration may be referred to as "RemoveVEC." Through the transaction 4009, the client apparatus 2000 can request a deletion of the coding information VEC from the MediaProfile designated by the ProfileToken ID information. More specifically, the client apparatus 2000 transmits a RemoveVEC request to the monitoring camera 1000. If the monitoring camera 1000 receives the RemoveVEC request, the monitoring camera 1000 transmits a RemoveVEC response replying to the received request to the client apparatus 2000.

Here, in a case where the MediaProfile includes both of the VEC1 and the VEC2, if a specific coding method is included, both of the VEC1 and the VEC2 are deleted. Practical examples of the specific coding method are JPEG, MPEG4, and H.264, which are the coding methods conforming to both of the SetVEC and SetVEC2 commands.

Further, in a case where the MediaProfile includes only the VEC2, if the request received from the client apparatus 2000 (i.e., the client apparatus that is not operable in conformity to the VEC2) is RemoveVEC, the monitoring camera 1000 can transmit a NoConfig response to the client apparatus 2000 without deleting the VEC2. Further, it is feasible to perform a setting operation in such a way as to delete the VEC2 even when the client apparatus 2000 cannot confirm the contents of the VEC2.

A transaction 4010 is a transaction relating to the SetVEC command, according to which the client apparatus 2000 can change the settings of respective parameters included in the VEC. More specifically, the client apparatus 2000 transmits a SetVEC request to the monitoring camera 1000. If the monitoring camera 1000 receives the SetVEC request, the monitoring camera 1000 transmits a response replying to the received request to the client apparatus 2000.

In the transaction, the monitoring camera 1000 causes the storage unit 1002 to store the parameters included in the VEC1.

In this case, as mentioned below, the monitoring camera 1000 can cause the storage unit 1002 to simultaneously store VEC2 obtained through a conversion of description format from VEC1 to VEC2.

A transaction 4011 is a transaction relating to a GetStreamUri command, through which the client apparatus 2000 can acquire address (StreamURI) information required to cause the monitoring camera 1000 to distribute a distribution stream based on the designated MediaProfile settings.

The monitoring camera 1000 transmits the parameter assembly VSC associated with the distribution profile ID designated by the client apparatus 2000, together with the address information required to perform streaming distribution processing for the image data that corresponds to the VEC contents, to the client apparatus 2000.

A transaction 4012 is a transaction relating to a DESCRIBE action, through which the client apparatus 2000 can request an acquisition of distribution information. More specifically, the client apparatus 2000 transmits a DESCRIBE command to the monitoring camera 1000. If the monitoring camera 1000 receives the DESCRIBE command, the monitoring camera 1000 transmits a DESCRIBE response replying to the received command to the client apparatus 2000.

In the transaction 4012, the client apparatus 2000 requests and acquires information about the contents of the streaming distribution processing to be performed by the monitoring camera 1000, by executing the DESCRIBE command using the URI information acquired in the transaction 4011.

A transaction 4013 is a transaction relating to a SETUP action, through which the client apparatus 2000 can request distribution settings. More specifically, the client apparatus 2000 transmits a SETUP command to the monitoring camera 1000. If the monitoring camera 1000 receives the SETUP command, the monitoring camera 1000 transmits a SETUP response replying to the received command to the client apparatus 2000.

In the transaction 4013, the client apparatus 2000 causes the monitoring camera 1000 to prepare for the streaming processing based on detailed data relating to the distribution information acquired in the transaction 4012. Executing the above-mentioned command enables the client apparatus 2000 and the monitoring camera 1000 to share the transmission method for the stream that includes a session number.

A transaction 4014 is a transaction relating to a PLAY action, through which the client apparatus 2000 can cause the monitoring camera 1000 to start the streaming distribution processing. More specifically, the client apparatus 2000 transmits a PLAY command to the monitoring camera 1000. If the monitoring camera 1000 receives the PLAY command, the monitoring camera 1000 transmits a PLAY response replying to the received command to the client apparatus 2000.

When the client apparatus 2000 transmits the PLAY command to the monitoring camera 1000, the client apparatus 2000 can request the monitoring camera 1000 to start the streaming processing while designating the session number acquired in the transaction 4013.

A stream 4015 is a stream distributed from the monitoring camera 1000 to the client apparatus 2000. In response to the start instruction requested in the transaction 4014, the monitoring camera 1000 distributes the stream according to the transmission method shared in the transaction 4013.

A transaction 4016 is a transaction relating to a TEARDOWN action, though which the client apparatus 2000 can cause the monitoring camera 1000 to stop the distribution processing. More specifically, the client apparatus 2000 transmits a TEARDOWN command to the monitoring camera 1000. If the monitoring camera 1000 receives the TEARDOWN command, the monitoring camera 1000 transmits a TEARDOWN response replying to the received command.

In the transaction 4016, the client apparatus 2000 can request the monitoring camera 1000 to stop the streaming processing by executing the TEARDOWN command, while designating the session number acquired through the transaction 4013.

As mentioned above, the typical command sequence described with reference to FIGS. 1 to 6 is an example of the processing that can be performed between the monitoring camera 1000 in which the H.265 coding method can be implemented and the client apparatus 2000 that is operable according to only the conventional commands, in a case where the monitoring camera 1000 is operable in conformity to both of the VEC1 and the VEC2.

Figure 7:
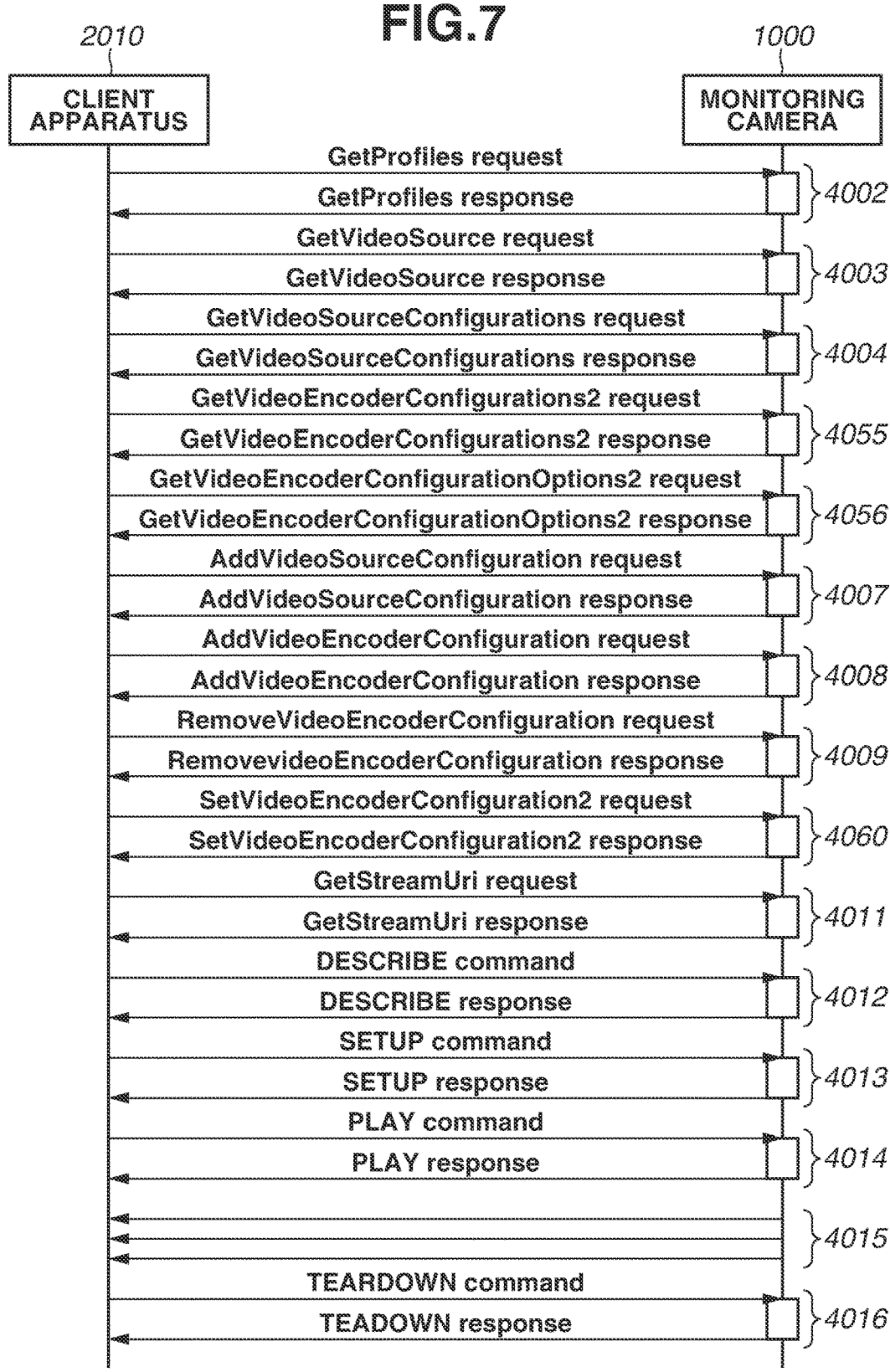
FIG. 7

FIG. 7 is a command sequence diagram illustrating typical processing, which can be performed between the monitoring camera 1000 and the client apparatus 2010, to set a MediaProfile required to distribute a video. In the present exemplary embodiment, each transaction is constituted by a pair of a request (or command) and a response replying to the request (or command). The client apparatus 2010 transmits a request (or command) to the monitoring camera 1000. When the monitoring camera 1000 receives the request (or command), the monitoring camera 1000 transmits a response replying to the request (or command) to the client apparatus 2010.

The command sequence illustrated in FIG. 7 includes transactions similar to those illustrated in FIG. 6. The similar transactions are denoted by the same reference numerals and redundant description thereof will be avoided.

A transaction 4055 is a transaction relating to the GetVideoEncoderConfigurations2 command, through which the client apparatus 2010 can acquire all lists relating to the VideoEncoderConfiguration that are currently set in the monitoring camera 1000. More specifically, the client apparatus 2010 acquires all lists relating to the VEC1 and the VEC2 stored in the first and second storage units.

In this case, the lists relating to the VEC acquired by the client apparatus 2010 as the response in step 4055 include 3020, 3021 and 3031 in the VEC1 illustrated in FIG. 5.

A transaction 4056 is a transaction relating to the GetVideoEncoderConfigurationOptions2 command, through which the client apparatus 2010 can acquire choices and setting value ranges of respective parameters that can be received by the monitoring camera 1000, with respect to the VEC designated by the VEC2Token ID information or the ProfileToken ID information.

A transaction 4060 is a transaction relating to the SetVEC2 command, through which the client apparatus 2010 can set each parameter of the VEC. More specifically, the client apparatus 2010 transmits a SetVEC2 request to the monitoring camera 1000. If the monitoring camera 1000 receives the SetVEC2 request, the monitoring camera 1000 transmits a SetVEC2 response replying to the received request to the client apparatus 2010.

In the above-mentioned transaction 4060, the monitoring camera 1000 causes the storage unit 1002 to store each parameter of the VEC2.

In this case, if the coding method included in the VEC2 is a coding method that can be set by the SetVEC command, the monitoring camera 1000 can additionally store VEC1 (i.e., the converted VEC2) obtained through a conversion of description format from VEC2 to VEC1. Alternatively, the monitoring camera 1000 can store only the VEC1 without including the VEC2.

As mentioned above, the typical command sequence that can be performed between the monitoring camera 1000 in which the H.265 coding method is implemented and the client apparatus 2010 that is operable in conformity to new commands, in a case where the monitoring camera 1000 is operable in conformity to both the VEC and the VEC2, has been described with reference to FIGS. 1 to 7.

Subsequently, VEC setting command reception processing that can be performed by the monitoring camera apparatus 1000 when a VEC setting command is received will be described in detail below with reference to a flowchart illustrated in FIG. 8. The processing illustrated in FIG. 8 can be performed by the control unit 1001.

The monitoring camera apparatus 1000 can receive a plurality of coding method setting commands, which can set an appropriate coding method for encoding captured images acquired by the imaging unit 1003, via the communication unit 1005. The control unit 1001 analyzes each command having been subjected to appropriate packet processing when the reception of the coding method setting commands is completed. The control unit 1001 performs command reception processing based on analysis results.

In step S1400, if the VEC setting command received by the control unit 1001 is SetVEC, the operation proceeds to step S1401. If the received VEC setting command is SecVEC2, the operation proceeds to step S1402. If the received VEC setting command is SetVEC3, the operation proceeds to step S1403.

The SetVEC3 command includes a coding method that is different from those included in the SetVEC and SetVEC2 commands.

If the above-mentioned processing has been completed, the control unit 1001 terminates the VEC setting command reception processing. In the processing of the flowchart illustrated in FIG. 8, the number of VEC setting commands is three types. However, the number of VEC setting commands can be two types or can be four or more types.

Figure 8:
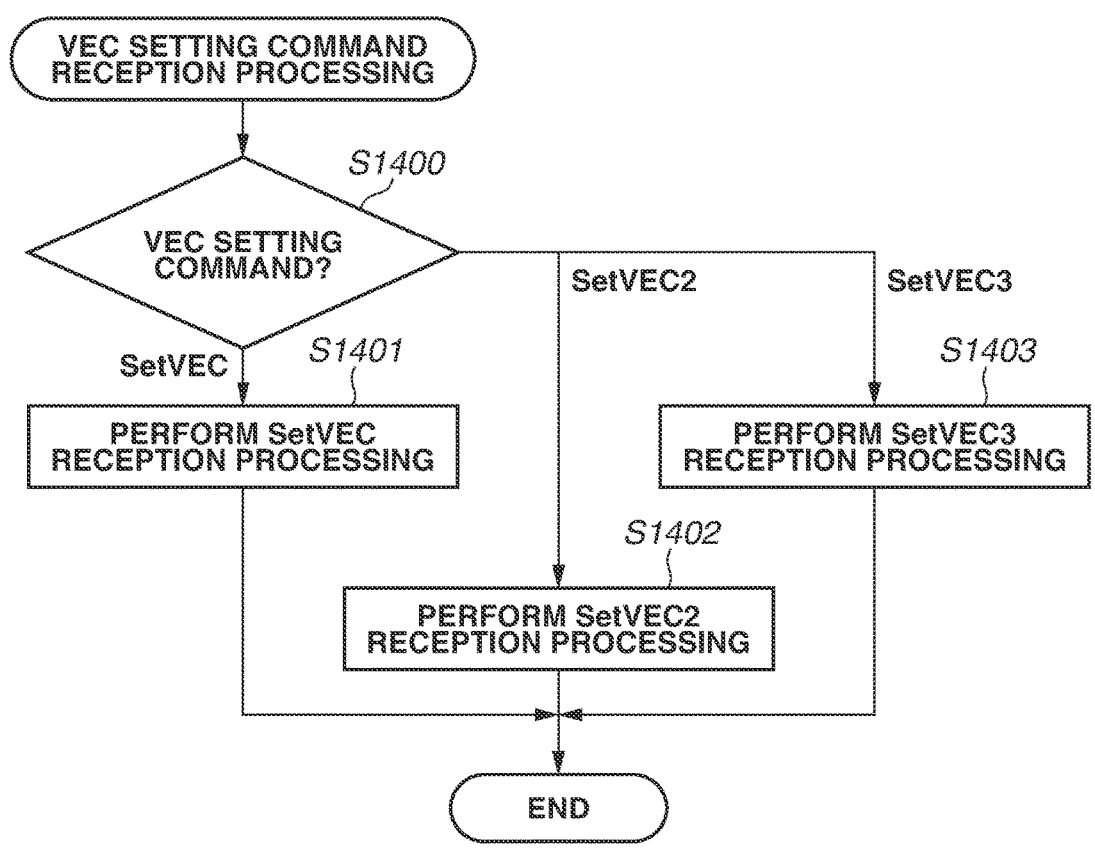
FIG. 8
Figure 9:
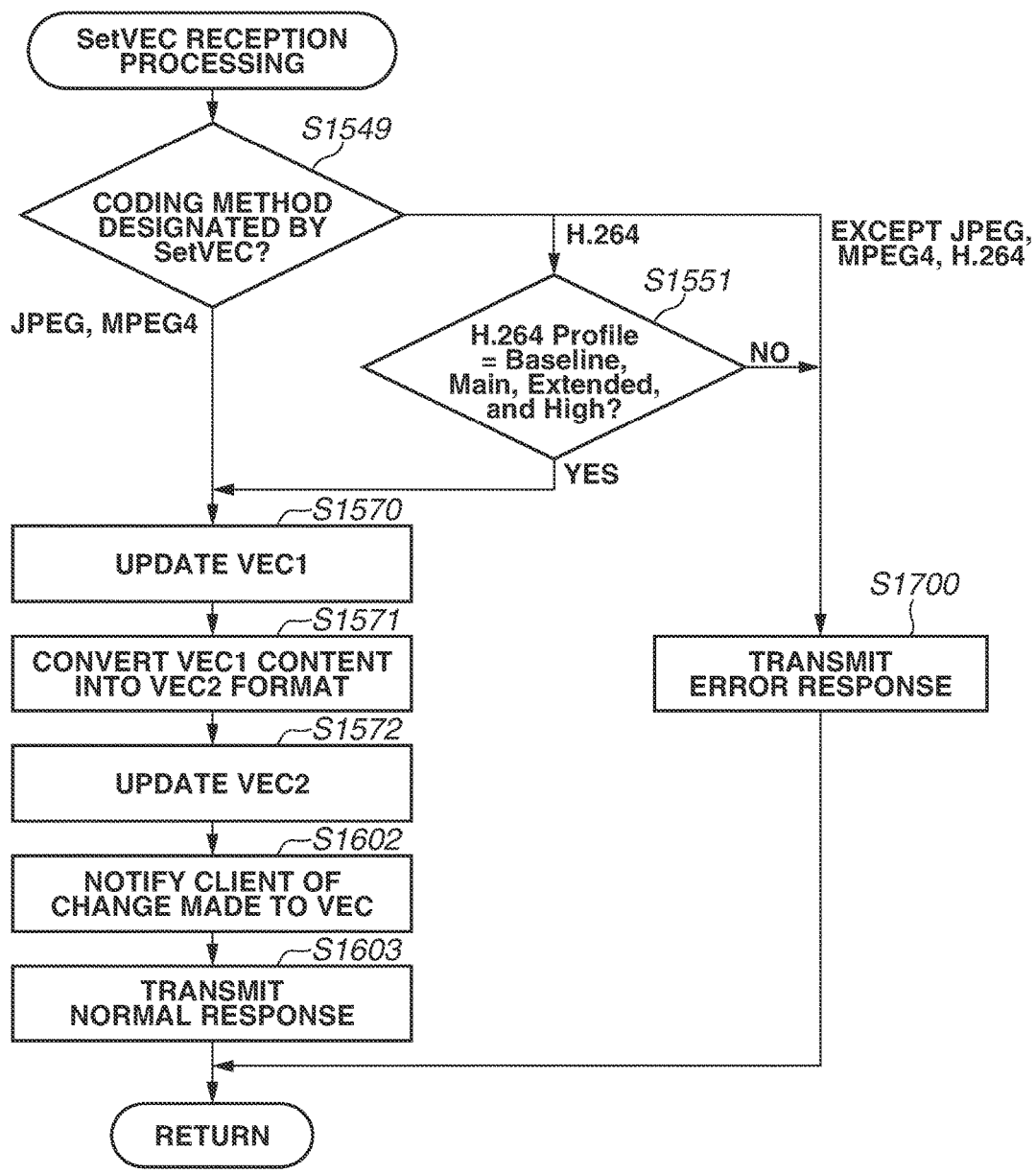
FIG. 9

FIG. 9 is a flowchart illustrating SetVEC reception processing that can be performed by the control unit 1001 in step S1401 illustrated in FIG. 8. In step S1549, the control unit 1001 checks the type of the coding method designated by the SetVEC command. If the type of the designated coding method is JPEG and MPEG4, the operation proceeds to step S1570. If the type of the designated coding method is H.264, the operation proceeds to step S1551. Further, if the type of the designated coding method is not JPEG, MPEG4, and H.264, the operation proceeds to step S1700. For example, when the type of the designated coding method is H.265 or JPEG2000, the operation proceeds to step S1700.

In step S1551, the control unit 1001 checks details of H.264 profile. If it is determined that the H.264 profile is Baseline, Main, Extended, and High, the operation proceeds to step S1570. If it is determined that the H.264 profile is other profile (e.g., ProgressiveHigh Profile), the operation proceeds to step S1700.

In step S1570, the control unit 1001 updates the contents of the VEC1 with the information described in the received SetVEC command. Then, the operation proceeds to step S1571. In step S1571, the control unit 1001 automatically converts the setting contents of the VEC1 to the description format of the VEC2. Then, the operation proceeds to step S1572.

In step S1572, the control unit 1001 updates the VEC2 with the information obtained in step S1571 (i.e., the converted VEC1 setting contents conforming to the VEC2). Then, the operation proceeds to step S1602. More specifically, through the processing in steps S1570 to S1572, the VEC settings designated by the SetVEC command are stored in both the storage unit of the VEC1 and the storage unit of the VEC2.

If each of the above-mentioned processing has been completed, then in step S1602, the control unit 1001 notifies the client apparatus of the changes or modifications having been added to the VEC. Then, the operation proceeds to step S1603.

In step S1603, the control unit 1001 transmits a normal response to the client apparatus and terminates the processing of the flowchart illustrated in FIG. 9.

On the other hand, in step S1700, the control unit 1001 transmits an error response to the client apparatus and terminates the processing of the flowchart illustrated in FIG. 9.

Through the above-mentioned processing, for example, when the GetVECs2 command has been acquired from the client apparatus 2010, the control unit 1001 can acquire all lists relating to the VEC with reference to the contents of the VEC2. Therefore, it becomes feasible to simplify the implementation of the system and improve the response in processing. In the present exemplary embodiment, the control unit 1001 is functionally operable as a conversion unit configured to convert the VEC1 including the coding information into the VEC2 that is different in description format.

Figure 10:
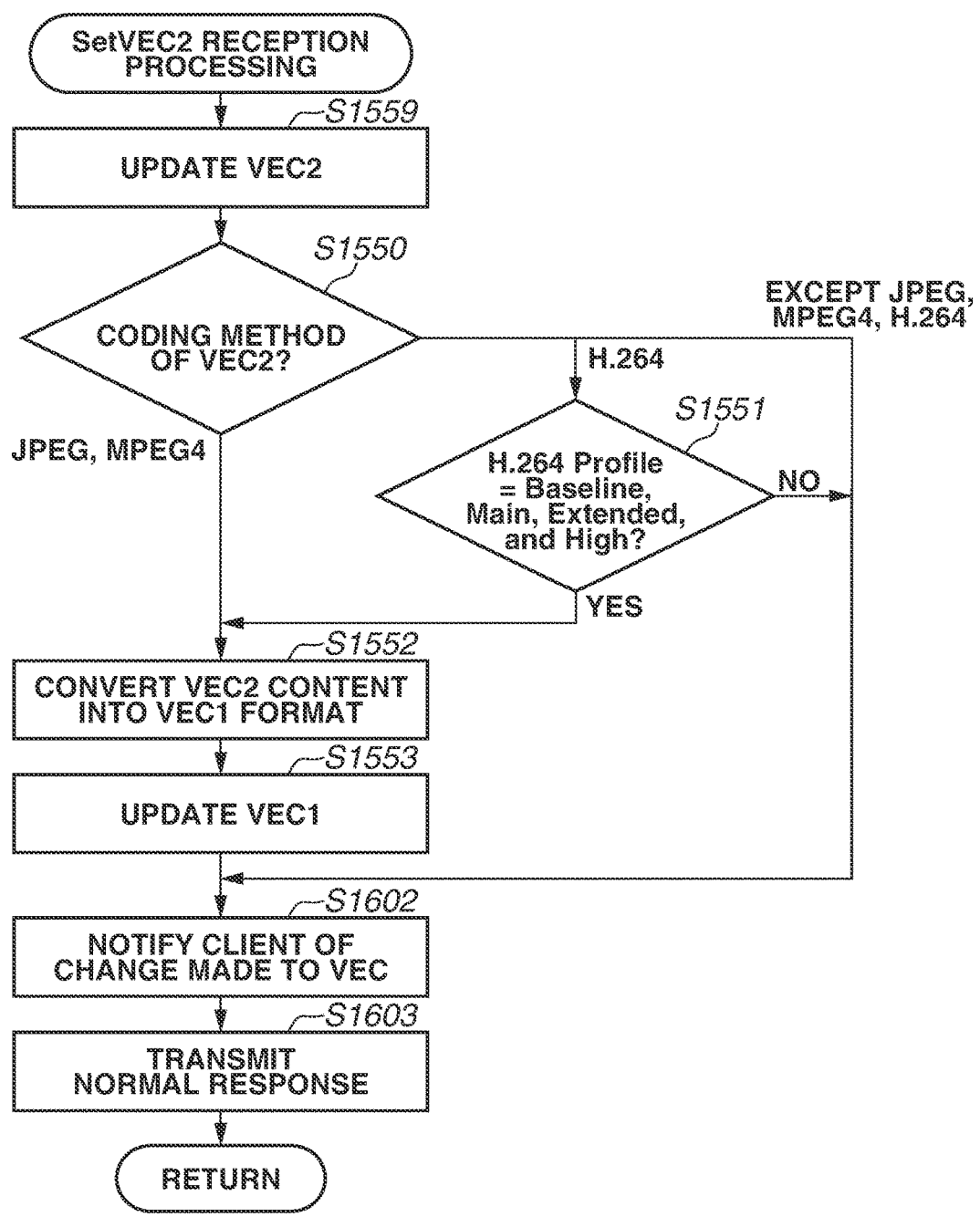
FIG. 10

FIG. 10 is a flowchart illustrating SetVEC2 reception processing that can be performed by the control unit 1001 in step S1402 illustrated in FIG. 8.

In step S1559, the control unit 1001 updates the VEC2 with the information described in the received SetVEC2 command. Then, the operation proceeds to step S1550.

In step S1550, the control unit 1001 checks the coding methods to be set according to the SetVEC2 command. If the JPEG and MPEG4 coding methods are set, the operation proceeds to step S1552. If the H.264 coding method is set, the operation proceeds to step S1551. Further, if other coding method (e.g., H.265 or JPEG2000) is set, the operation proceeds to step S1602.

In step S1551, the control unit 1001 checks details of H.264 profile. If it is determined that the H.264 profile is Baseline, Main, Extended, and High, the operation proceeds to step S1552. If it is determined that the H.264 profile is other profile (e.g., ProgressiveHigh Profile), the operation proceeds to step S1602.

In step S1552, the control unit 1001 automatically converts the setting contents of the VEC2 in conformity to the description format of the VEC1. Then, the operation proceeds to step S1553.

In step S1553, the control unit 1001 updates the VEC1 with the information obtained by converting the setting contents of the VEC2 in conformity to the VEC1. Then, the operation proceeds to step S1602. More specifically, through the sequential processing in steps S1559 to S1553, the VEC settings designated by the SetVEC2 command are stored in both the storage unit of the VEC1 and the storage unit of the VEC2.

If the above-mentioned processing has been completed, then in step S1602, the control unit 1001 notifies the client apparatus of the changes or modifications having been added to the VEC. Then, the operation proceeds to step S1603.

In step S1603, the control unit 1001 transmits a normal response to the client apparatus and terminates the processing of the flowchart illustrated in FIG. 10.

Through the above-mentioned processing, for example, when the GetVECs2 command has been acquired from the client apparatus 2010, the control unit 1001 can acquire all lists relating to the VEC with reference to only the contents of the storage unit of the VEC2. Therefore, it becomes feasible to simplify the implementation of the system and improve the response in processing.

Figure 12:
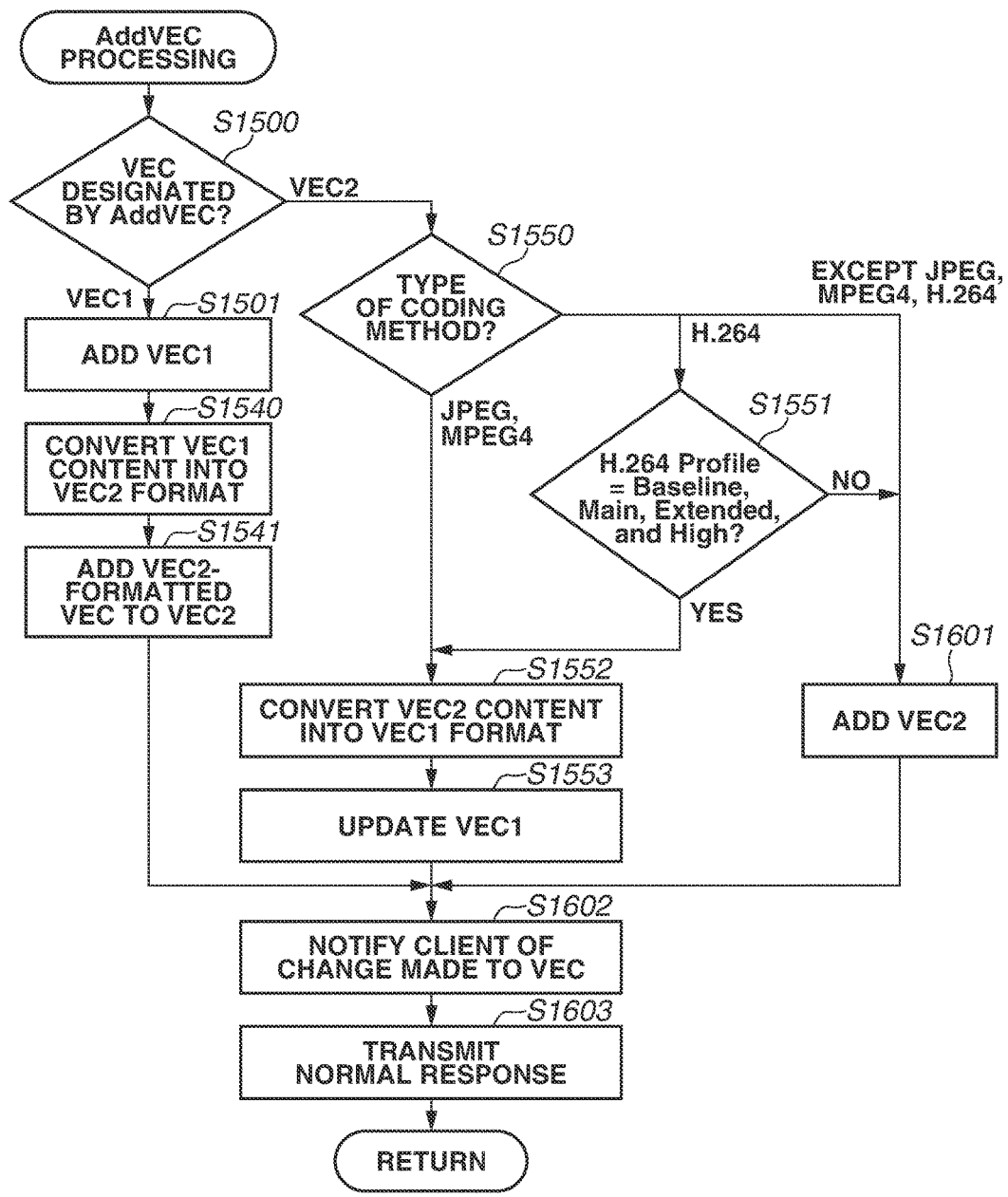
FIG. 12
Figure 13:
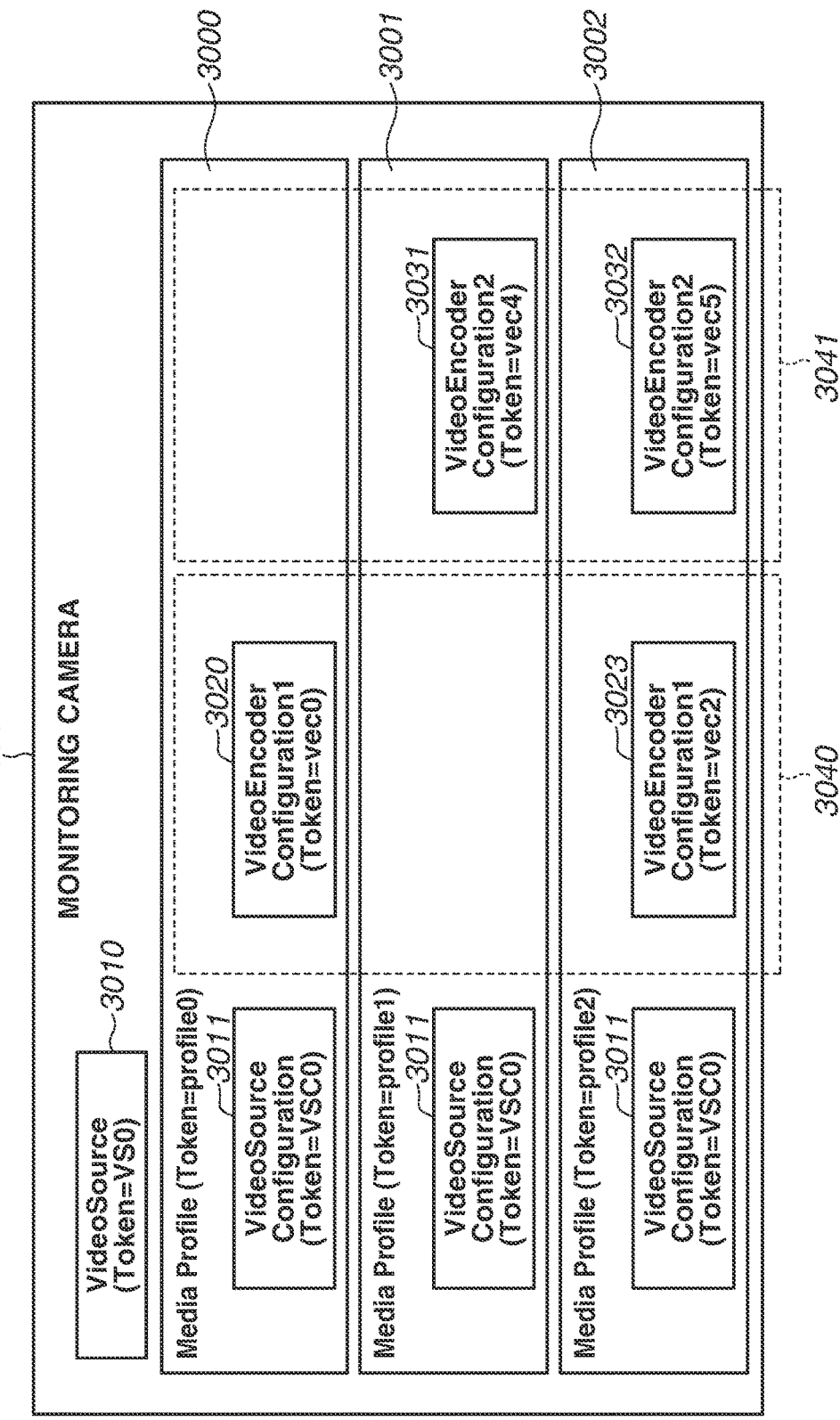
FIG. 13

FIG. 13 is a diagram illustrating a parameter configuration of the monitoring camera apparatus 1000 obtained after the contents of the VEC are synchronized with each other between the first storage unit and the second storage unit through the processing of the flowcharts illustrated in FIGS. 9, 10, and 12. In the parameter set MP 3002 illustrated in FIG. 13, the coding method of the VEC1 (3023) is identical to the coding method of the VEC2 (3032).

Figure 14:
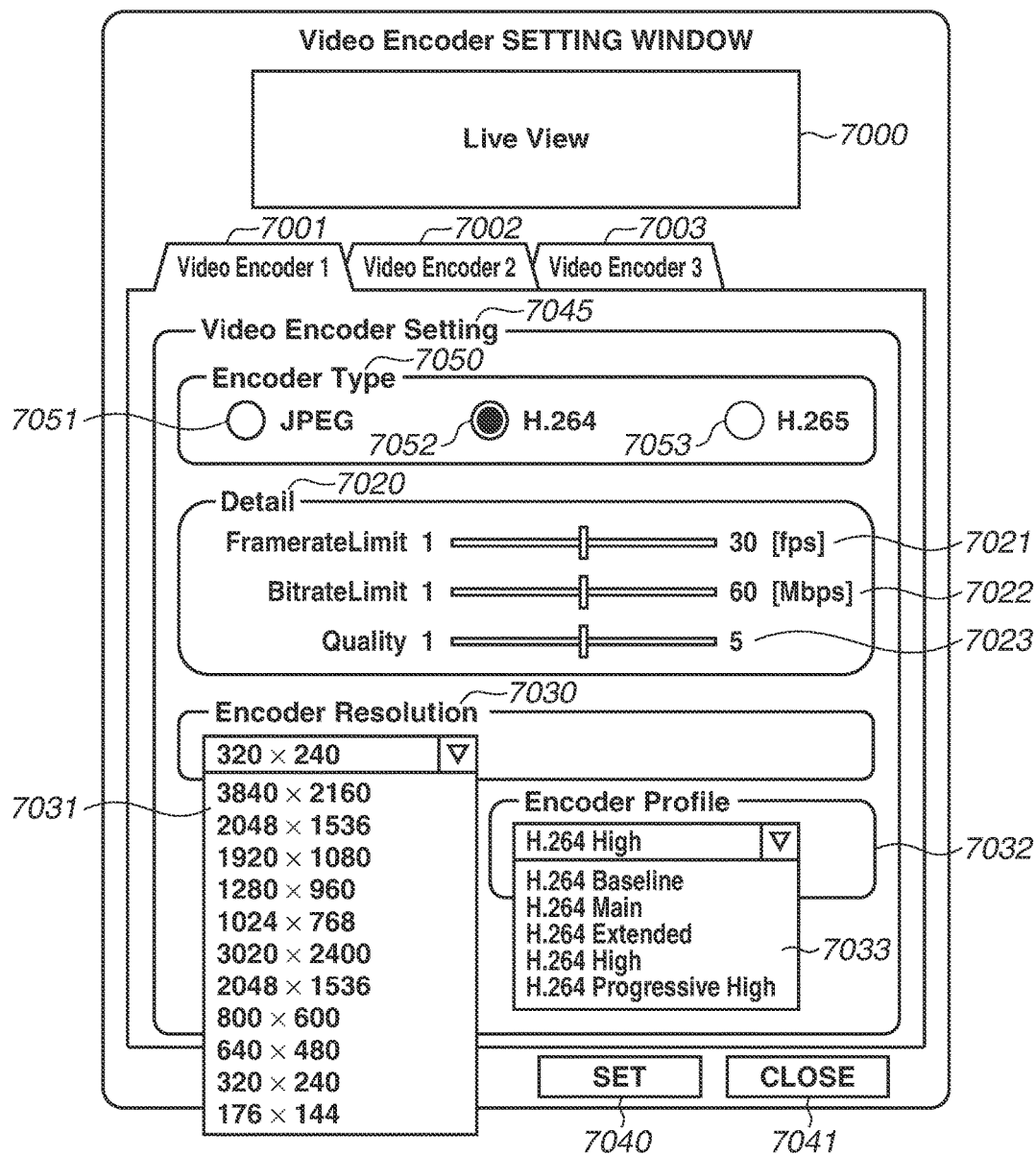
FIG. 14
Figure 15:
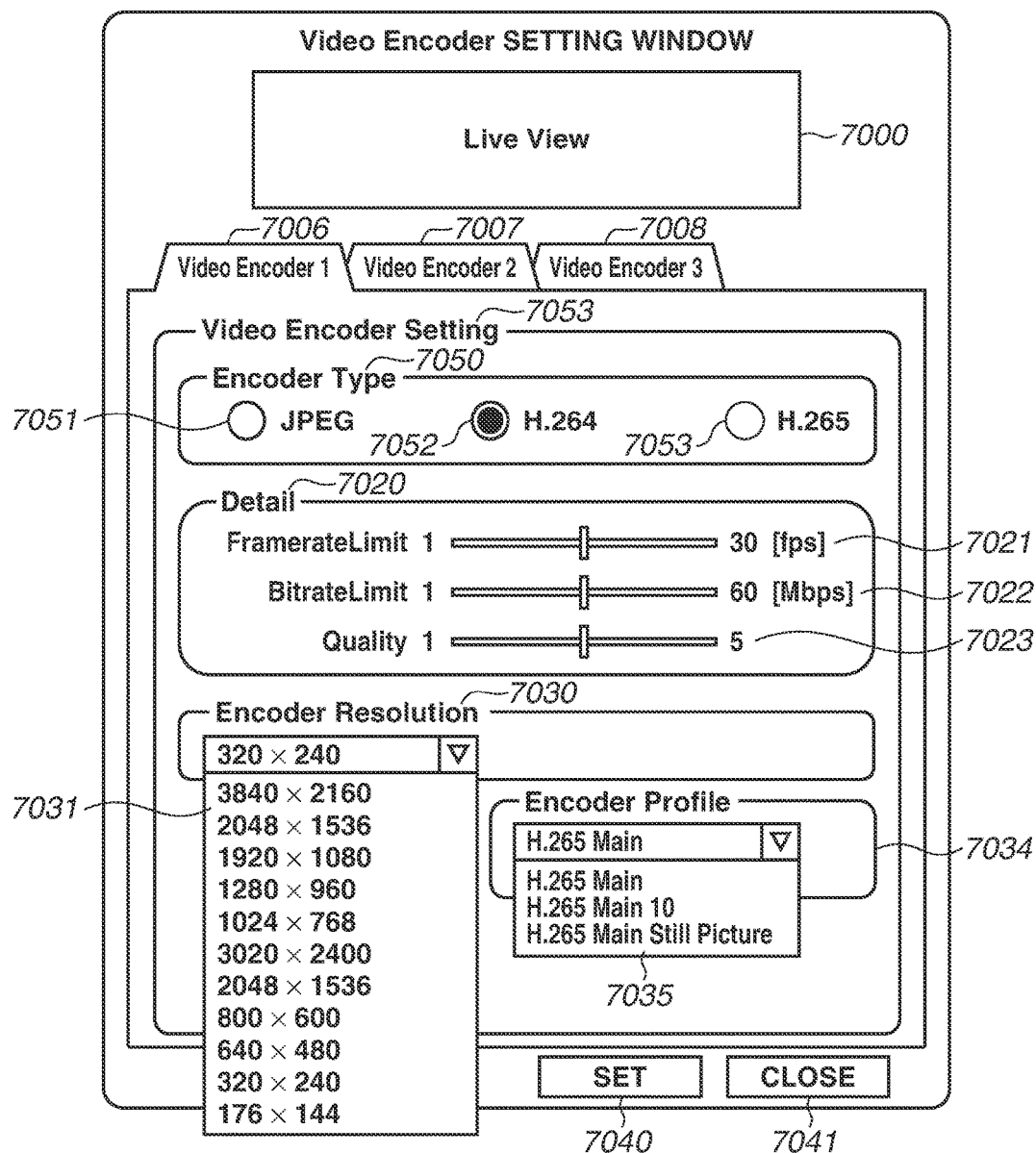
FIG. 15

Each of FIGS. 14 and 15 is a diagram illustrating a user interface of the client apparatus 2010 that enables a user to designate the VEC of the monitoring camera 1000 according to the present exemplary embodiment.

When a Live View window 7000 illustrated in FIG. 14 is opened, the client apparatus 2010 performs the above-mentioned processing according to the sequence illustrated in FIG. 7. Therefore, images corresponding to a video stream obtained through the transaction 4015 can be displayed on the Live View window 7000.

Further, the client apparatus 2010 acquires all lists relating to the VEC from the monitoring camera 1000 by transmitting the GetVECs2 command to the monitoring camera 1000. Then, the client apparatus 2010 displays VideoEncoder setting tabs 7001, 7002, and 7003 on the screen illustrated in FIG. 14 by referring to the obtained results (i.e., the acquired lists). The parameter set MP 3001 corresponds to the setting tab 7001. The parameter set MP 3002 corresponds to the setting tab 7002. The parameter set MP 3003 corresponds to the setting tab 7003.

Further, the client apparatus 2010 acquires choices and setting value ranges of respective parameters relating to the VEC by transmitting the GetVECOptions2 command. Then, the client apparatus 2010 displays the choices and the setting value ranges of respective VideoEncoder parameters in a field 7045 on the screen illustrated in FIG. 14 by referring to the obtained results (i.e., the acquired choices and setting value range).

The screen illustrated in FIG. 14 includes an Encoder Type area 7050 that enables a user to select a desired compression coding method for each VEC. The coding method set for the VEC1 of the parameter set MP 3001 is H.264. Therefore, a black mark is currently displayed, in a state where a radio button dedicated to H.264 is pressed, on the display screen illustrated in FIG. 14.

The screen illustrated in FIG. 14 includes a Detail area 7020 that enables a user to select desired levels of the FramerateLimit, BitrateLimit, and Quality parameters that are included in the VEC 3021. When the screen illustrated in FIG. 14 is opened, detailed contents of respective parameter setting ranges obtained by executing the GetVECOs2 command can be displayed as indicated by reference numerals 7021, 7022, and 7023.

The screen illustrated in FIG. 14 includes an Encoder Resolution area 7030 that enables a user to select a desired value of the resolution (Resolution). When the screen illustrated in FIG. 14 is opened, a drop-down list 7031 can be displayed to indicate the selected contents of the resolution parameter obtained by executing the GetVECOs2 command.

The screen illustrated in FIG. 14 includes a selection area 7033 that enables a user to select a desired encoder profile. A drop-down menu can be displayed in the selection area 7033 when the user clicks on a down-arrow button provided on the right side thereof with the mouse. The user can select a desired encoder profile from a list of selectable encoder profiles displayed in the selection area 7033. More specifically, according to the example illustrated in FIG. 14, the encoder profile in a selected state on the drop-down menu is H.264HighPprofile. In other words, a live video can be displayed on the Live View window 7000 based on H.264HighProfile compression coded image stream data, which can be decoded by the decoding unit 2015 of the client apparatus 2010.

FIG. 15 illustrates a state where the H.265 radio button is pressed by a user to designate another EncoderType on the screen illustrated in FIG. 14. The screen operation performed by the user in this case corresponds to step S1601 illustrated in FIG. 11. In this case, no change is added to the VEC1 and the content of the storage unit remains the same.

If the user clicks on a setting button 7040 in this state, the AddVEC command is transmitted from the client apparatus 2010 to the monitoring camera 1000. The operation proceeds to step S1500 illustrated in FIG. 12. When the designated EncoderType is H.265, the operation proceeds to step S1550, step S1601, and step S1602 successively. In this case, it is useful to display a change confirmation notification on the display screen of the client apparatus 2010 so that the user can reconfirm the added changes or modifications.

FIG. 16 is a diagram illustrating an actual configuration of a GetProfile command according to the present exemplary embodiment.

FIG. 17 is a diagram illustrating a definition example of the VideoEncoderConfiguration2 according to the present exemplary embodiment.

As illustrated in FIG. 17, the VideoEncoderConfiguration2 is defined by the ProfileExtension2.

FIG. 18 illustrates a detailed content of the VideoEncoderConfiguration2 command. As illustrated in FIG. 18, the VideoEncoderConfiguration2 command includes a sequence designator that designates sequential appearance of elements illustrated in FIG. 18 according to a defined order.

In FIG. 18, Encoding is a parameter that designates a desired coding method. Resolution is a parameter that designates a desired value of the resolution. Width is a parameter that designates a desired number of pixels horizontally disposed on the screen. Height is a parameter that designates a desired number of pixels vertically disposed on the screen.

Quality is a parameter that designates a desired level of the image quality. Further, RateControl is a parameter that designates a desired frame rate. The parameter RateControl includes FrameRateLimit, which is a parameter that designates an upper-limit value of the frame rate.

Further, the parameter RateControl includes EncodingInterval, which is a parameter that designates both coding and transmission interval. Further, the parameter RateControl includes Bitratelimit, which is a parameter that designates an upper-limit bit rate of a video stream.

Multicast is a parameter that designates a multicast number of the video stream. Further, SessionTimeout is a parameter that designates a desired time-out time of the video stream. Further, GovLength is a parameter that designates a desired interval of I frame.

Further, EncodingProfile is a parameter that designates a profile of the coding method. For example, when the coding method is H.265, the profile that can be designated by the parameter EncodingProfile is Main, Main10, or MainStillPicture, etc.

As mentioned above, the monitoring camera apparatus that is operable in conformity to a new coding method according to the present invention can maintain backward compatibility in coding method settings, in a monitoring camera system including a plurality of client apparatuses.

Further, if the information included in the SetVEC or SetVEC2 command is not relevant to the coding method, the control unit 1001 according to the present exemplary embodiment can perform the operational determination processing based on the information not related to the coding method insteps S1549 and S1559 illustrated in FIG. 9 or 10.

More specifically, when the information in the SetVEC or SetVEC2 command includes frame rate, image quality, or bit rate, such non-relevant information can be used in the determination processing. Further, any combination of the non-related information and the coding method can be used in the determination processing.

Further, if the information included in the SetVEC or SetVEC2 command is not relevant to the coding method, the control unit 1001 according to the present exemplary embodiment can convert the format of such non-relevant information in step S1571 or step S1552 illustrated in FIG. 9 or 10. More specifically, frame rate, image quality, and bit rate included in the SetVEC or SetVEC2 command are examples of the non-relevant information to be subjected to the conversion processing. In this case, if the imaging apparatus 1000 is not operable in conformity to the settings based on the above-mentioned information, the control unit 1001 can transmit an error response similar to that in step S1700 before terminating the processing of the illustrated flowchart.

A second exemplary embodiment will be described in detail below. The operation described in the first exemplary embodiment includes updating the VEC2 with the information described in the SetVEC2 command when the SetVEC2 command is received.

However, the update timing of the VEC2 is not limited to the above-mentioned example. If the coding method designated by the VEC2 is a coding method settable by the SetVEC command, it is useful to cause the storage unit of the VEC1 to store VEC information through a conversion of description format from VEC2 to VEC1.

Hereinafter, an operation according to the second exemplary embodiment will be described in detail below with reference to the flowchart illustrated in FIG. 11. The processing illustrated in FIG. 11 can be performed by the control unit 1001.

The monitoring camera apparatus 1000 can receive a plurality of coding method setting commands, which can set an appropriate coding method for encoding captured images acquired by the imaging unit 1003, via the communication unit 1005. The control unit 1001 analyzes each command having been subjected to appropriate packet processing when the reception of the coding method setting commands is completed. The control unit 1001 performs command reception processing based on analysis results.

In step S1600, the control unit 1001 checks the type of the coding method designated by the SetVEC2 command. If the designated coding method is JPEG and MPEG4, the operation proceeds to step S1552. If the designated coding method is H.264, the operation proceeds to step S1551. Further, the designated coding method is not JPEG, MPEG4, and H.264, the operation proceeds to step S1601. For example, when the type of the designated coding method is H.265 or JPEG2000, the operation proceeds to step S1601.

In step S1601, the control unit 1001 updates the VEC2. Then, the operation proceeds to step S1602.

In step S1551, the control unit 1001 checks details of H.264 profile. If it is determined that the H.264 profile is Baseline, Main, Extended, and High, the operation proceeds to step S1552. If it is determined that the H.264 profile is other profile (e.g., ProgressiveHigh Profile), the operation proceeds to step S1601.

In step S1552, the control unit 1001 automatically converts the setting contents of the VEC2 in conformity to the description format of the VEC1. Then, the operation proceeds to step S1553.

In step S1553, the control unit 1001 updates the VEC1 with the information obtained by converting the setting contents of the VEC2 in conformity to the VEC1. Then, the operation proceeds to step S1602.

If the above-mentioned processing has been completed, then in step S1602, the control unit 1001 notifies the client apparatus of the changes or modifications added to the VEC. Subsequently, the operation proceeds to step S1603.

Figure 11:
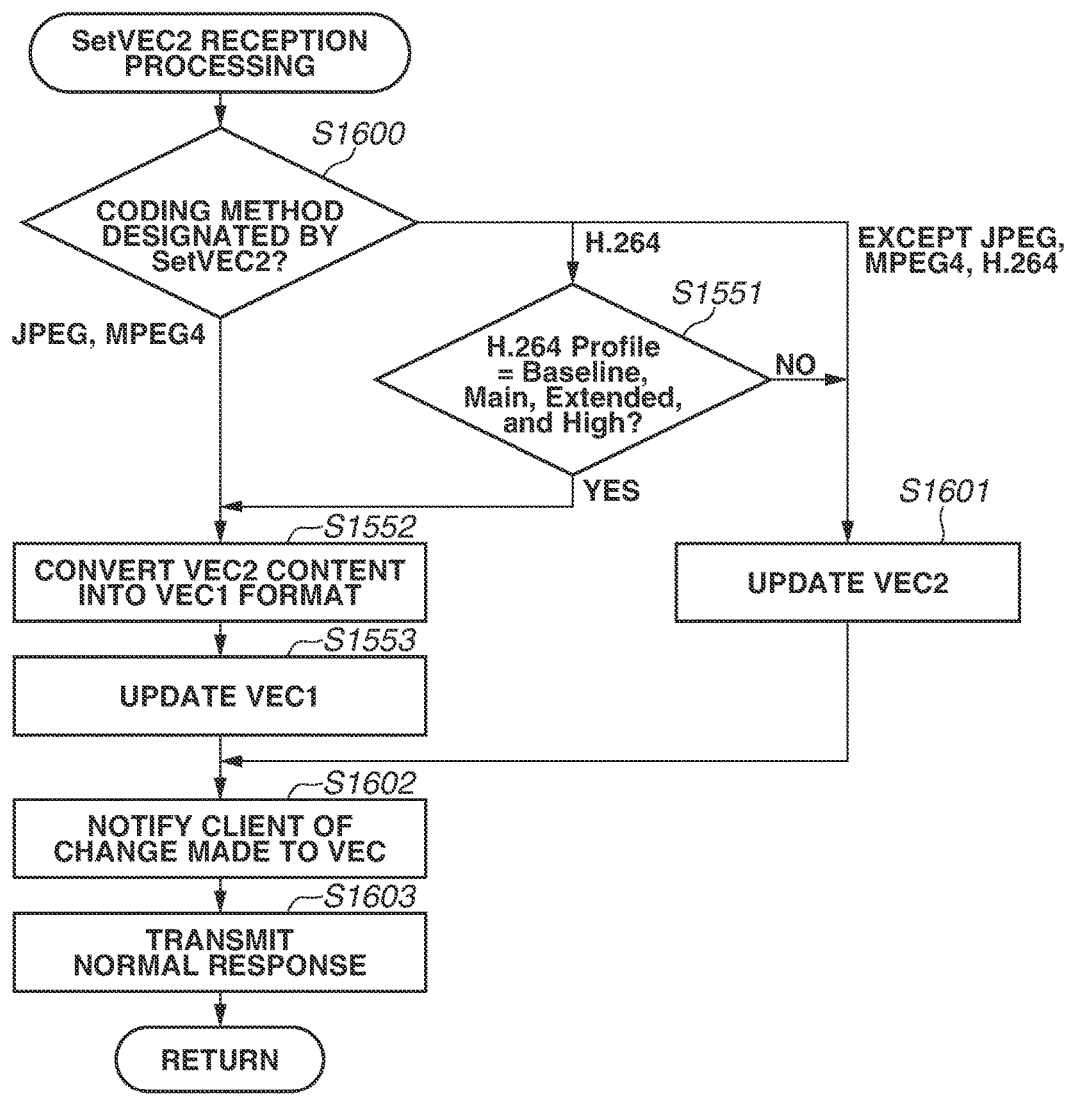
FIG. 11

In step S1603, the control unit 1001 transmits a normal response to the client apparatus and terminates the processing of the flowchart illustrated in FIG. 11.

In the present exemplary embodiment, when the SetVEC2 command is received, the monitoring camera apparatus 1000 determines whether the coding method designated in the VEC2 is the coding method settable by the SetVEC command through the above-mentioned processing. If it is determined that the designated coding method is the coding method settable by the SetVEC command, the monitoring camera apparatus 1000 causes the storage unit of the VEC1 to store VEC information through a conversion of description format from VEC2 to VEC1. The above-mentioned processing according to the present exemplary embodiment is useful in that the system can operate in conformity to both the SetVEC command and the SetVEC2 command simultaneously. Further, the capacity of the storage unit can be reduced.

Hereinafter, a third exemplary embodiment will be described in detail below. The operations described in the first and second exemplary embodiments include updating the VEC with the information described in the SetVEC command when the SetVEC command is received.

However, the update timing of the VEC is not limited to the above-mentioned example. It is useful to cause the control unit 1001 to update the VEC when the AddVEC command is received.

An operation according to the third exemplary embodiment will be described in detail below with reference to a flowchart illustrated in FIG. 12.

FIG. 12 is the flowchart illustrating processing that can be performed by the monitoring camera apparatus 1000 when the AddVEC command is received from the client apparatus 2000 or 2010. The processing illustrated in FIG. 12 can be performed by the control unit 1001.

The monitoring camera apparatus 1000 can receive a plurality of coding method setting commands, which can set an appropriate coding method for encoding captured images acquired by the imaging unit 1003, via the communication unit 1005. The control unit 1001 analyzes each command having been subjected to appropriate packet processing when the reception of the coding method setting commands is completed. The control unit 1001 stores the information described in the VEC in the first storage area 3040 (i.e., the storage area dedicated to the VEC1) and the second storage area 3041 (i.e., the storage area dedicated to the VEC2) based on analysis results.

When the monitoring camera apparatus 1000 receives the AddVEC command via the communication unit 1005, the control unit 1001 performs AddVEC processing on the command having been subjected to appropriate packet processing.

More specifically, in step S1500, the control unit 1001 determines whether the ProfileToken ID and the VEC ID of the MediaProfile designated by the AddVEC command is VEC1Token ID or VEC2Token ID. The control unit 1001 can perform the determination processing in step S1500 by checking the storage unit of the VEC1 and the storage unit of the VEC2 provided in the monitoring camera apparatus 1000. If the control unit 1001 determines that the designated setting information is VEC1, the operation proceeds to step S1501. If the control unit 1001 determines that the designated setting information is VEC2, the operation proceeds to step S1550.

In step S1501, the control unit 1001 adds the VEC1 to the MediaProfile designated by the ProfileToken ID information. Then, the operation proceeds to step S1540.

In step S1540, the control unit 1001 automatically converts the setting contents of the VEC1 in conformity to the description format of the VEC2.

In step S1541, the control unit 1001 adds the information, which has been obtained by converting the setting contents of the VEC1 in conformity to the VEC2, to the VEC2. Then, the operation proceeds to step S1602.

On the other hand, in step S1550, the control unit 1001 checks the coding methods set in the VEC2. If the JPEG and MPEG4 coding methods are set, the operation proceeds to step S1552. If the H.264 coding method is set, the operation proceeds to step S1551. Further, if other coding method (e.g., H.265 or JPEG2000) is set, the operation proceeds to step S1601.

In step S1601, the control unit 1001 adds the VEC2. Then, the operation proceeds to step S1602.

If in step S1551 the control unit 1001 determines that the H.264 profile is Baseline, Main, Extended, and High, the operation proceeds to step S1552. If it is determined that the H.264 profile is other profile (e.g., ProgressiveHigh Profile), the operation proceeds to step S1601. In step S1552, the control unit 1001 automatically converts the setting contents of the VEC2 in conformity to the description format of the VEC1. Then, the operation proceeds to step S1553.

In step S1553, the control unit 1001 adds the information, which has been obtained by converting the setting contents of the VEC2 in conformity to the VEC1, to the VEC1. Then, the operation proceeds to step S1602.

If the control unit 1001 completes the above-mentioned processing, then in step S1602, the control unit 1001 notifies the client apparatus of the changes or modifications having been added to the VEC. Then, the operation proceeds to step S1603.

In step S1603, the control unit 1001 transmits a normal response to the client apparatus and terminates the processing of the flowchart illustrated in FIG. 12.

As mentioned above, the monitoring camera apparatus 1000 according to the present exemplary embodiment performs processing for synchronizing the contents of the storage unit of the VEC1 with the contents of the storage unit of the VEC2 through the above-mentioned processing when the monitoring camera apparatus 1000 receives the AddVEC command. Further, when both of the client apparatus 2000 and the client apparatus 2010 request transmission of the VEC list by the GetVECs or GetVECs2 command, the monitoring camera apparatus 1000 can immediately transmit a response to each of the client apparatuses.

Although the present invention has been described with reference to preferred exemplary embodiments, the present invention is not limited to the above-mentioned exemplary embodiments and can be modified and changed in various ways within the scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus for communicating with at least one of a first external apparatus and a second external apparatus via a network, the imaging apparatus comprising:
a computer executing instructions that, when executed by the computer, cause the computer to function as:
an imaging unit configured to capture an image of an object;
a coding unit configured to perform encoding processing which encodes the image captured by the imaging unit;
a reception unit configured to receive setting commands; which can be used to set a parameter for encoding processing performed by the coding unit, from the first external apparatus or the second external apparatus via the network, wherein the first external apparatus is capable of transmitting a first setting command for encoding processing performed by the coding unit and the second external apparatus is capable of transmitting a second setting command for encoding processing performed by the coding unit, the second setting command being different from the first setting command;
a storage unit configured to store a first parameter of the first setting command; and
a conversion unit configured to convert a format of a second parameter of the second setting command received from the second external apparatus into a format of the first setting command and store a converted parameter into the storage unit, in a case where the second parameter of the second setting command received from the second external apparatus indicates a predetermined encoding method, and not to convert the format of the second parameter of the second setting command received from the second external apparatus into the format of the first setting command, in a case where the second parameter of the second setting command received from the second external apparatus does not indicate the predetermined encoding method.

2. The imaging apparatus according to claim 1,
wherein the instructions further cause the computer to function as:
a determination unit configured to determine whether the second parameter of the second setting command received by the reception unit indicates the predetermined encoding method,
wherein the conversion unit is configured to perform conversion into the format of the first setting command, if the determination unit determines that the second parameter of the second setting command received by the reception unit indicates the predetermined encoding method.

3. The imaging apparatus according to claim 2,
wherein the instructions further cause the computer to function as:
a control unit configured to transmit an error notification to the external apparatus if the determination unit determines that the second parameter of the second setting command received by the reception unit does not indicate the predetermined encoding method.

4. The imaging apparatus according to claim 1, wherein the conversion unit is configured to convert a description format of the second parameter of the second setting command into a different description format.

5. The imaging apparatus according to claim 1, wherein a coding method to be set by the first setting command can be set by the second setting command.

6. The imaging apparatus according to claim 5, wherein JPEG, MPEG4, and H.264 are included as coding methods which can be set by the first setting command,
wherein JPEG, MPEG4, H.264 and at least one of JPEG2000, H.264ProgressiveHighProfile, and H.265 are included as a coding method which can be set by the second setting command, and
wherein the predetermined encoding method is at least one of JPEG, MPEG4, and H.264.

7. A control method for controlling an imaging apparatus for communicating with at least one of a first external apparatus and a second external apparatus via a network, wherein the first external apparatus is capable of transmitting a first setting command for encoding processing performed and the second external apparatus is capable of transmitting a second setting command for encoding processing performed, the second setting being different from the first setting command, wherein the control method comprising following steps:
causing the imaging apparatus to capture an image of an object;
performing encoding processing which encodes the image captured by the imaging apparatus;
receiving setting commands which can be used to set a parameter for encoding processing performed, from the first external apparatus or the second external apparatus via the network;
storing a first parameter of the first setting command into a storage unit; and
converting a format of a second parameter of the second setting command received from the second external apparatus into a format of the first setting command and store a converted parameter into the storage unit, in a case where the second parameter of the second setting command received from the second external apparatus indicates a predetermined encoding method, and not to convert the format of the second parameter of the second setting command received from the second external apparatus into the format of the first setting command, in a case where the second parameter of the second setting command received from the second external apparatus does not indicate the predetermined encoding method.

8. The method according to claim 7, wherein a coding method to be set by the first setting command can be set by the second setting command.

9. The method according to claim 8, wherein JPEG, MPEG4, and H.264 are included as coding methods which can be set by the first setting command,
wherein JPEG, MPEG4, H.264 and at least one of JPEG2000, H.264ProgressiveHighProfile and H.265 are included as a coding method which can be set by the second setting command, and
wherein the predetermined encoding method is at least one of JPEG, MPEG4, and H.264.

10. A non-transitory computer readable recording medium that stores a computer program for causing a computer to perform the control method, wherein the method comprising:
causing the imaging apparatus to capture an image of an object;
performing encoding processing which encodes the image captured by the imaging apparatus;
receiving setting commands which can be used to set a parameter for encoding processing performed, from the first external apparatus or the second external apparatus via the network, wherein the first external apparatus is capable of transmitting a first setting command for encoding processing performed and the second external apparatus is capable of transmitting a second setting command for encoding processing performed, the second setting command being different from the first setting command;
storing a first parameter of the first setting command into a storage unit; and
converting a format of a second parameter of the second setting command received from the second external apparatus into a format of the first setting command and store a converted parameter into the storage unit, in a case where the second parameter of the second setting command received from the second external apparatus indicates a predetermined encoding method, and not to convert the format of the second parameter of the second setting command received from the second external apparatus into the format of the first setting command, in a case where the second parameter of the second setting command received from the second external apparatus does not indicate the predetermined encoding method.

11. The medium according to claim 10, wherein a coding method to be set by the first setting command can be set by the second setting command.

12. The medium according to claim 11, wherein JPEG, MPEG4, and H.264 are included as coding methods which can be set by the first setting command,
wherein JPEG, MPEG4, H.264 and at least one of JPEG2000, H.264ProgressiveHighProfile, and H.265 are included as a coding method which can be set by the second setting command, and
wherein the predetermined encoding method is at least one of JPEG, MPEG4, and H.264.

13. The imaging apparatus according to claim 1, wherein the predetermined encoding method includes at least one of JPEG, MPEG4, and H.264.

14. The imaging apparatus according to claim 1, wherein the predetermined encoding method does not include H.265.

* * * * *